United States Patent [19]

Clow

[11] 4,088,964
[45] May 9, 1978

[54] MULTI-MODE THRESHOLD LASER

[76] Inventor: Richard G. Clow, 624 Black Canyon Stage, Phoenix, Ariz. 85020

[21] Appl. No.: 677,391

[22] Filed: Apr. 15, 1976

Related U.S. Application Data

[63] Continuation-in-part of Ser. No. 543,173, Jan. 22, 1975, abandoned, which is a continuation of Ser. No. 398,332, Sep. 18, 1973, abandoned, which is a continuation of Ser. No. 117,784, Feb. 22, 1971, abandoned, which is a continuation of Ser. No. 720,262, Apr. 10, 1968, abandoned.

[51] Int. Cl.² .............................................. H01S 3/10
[52] U.S. Cl. .............................................. 331/94.5 C
[58] Field of Search ........................ 331/94.5; 330/4.3; 332/7.51

[56] References Cited

U.S. PATENT DOCUMENTS

| | | | |
|---|---|---|---|
| 3,292,103 | 12/1966 | Soules et al. | 331/94.5 C |
| 3,316,501 | 4/1967 | Collins et al. | 331/94.5 C |
| 3,639,854 | 2/1972 | Baldwin | 331/94.5 Q |
| 3,774,121 | 11/1973 | Ashkin et al. | 331/94.5 M |

Primary Examiner—William L. Sikes

[57] ABSTRACT

An image amplifying multi-mode laser with image forming elements in the cavity and with a saturable absorber film at the focal plane in the cavity. Radiation from each point of an image is focused on the saturable absorber film so as to enter a distinct mode of the multi-mode laser. Pump power and saturable absorber film density are jointly adjusted so that a mode of the laser oscillates if and only if the intensity of the radiation from the corresponding image point exceeds a given threshold value. The energy emitted from the bistable laser oscillations constitutes the output. The multi-mode threshold laser is useful for image contrast enhancement, applying a threshold operation in optical information processing, selection of the maximum point of optical matched filter output images and as a naturally formed collection of optical logic elements. Embodiments are disclosed in retro-reflector cavities having both traveling and standing wave modes.

6 Claims, 21 Drawing Figures

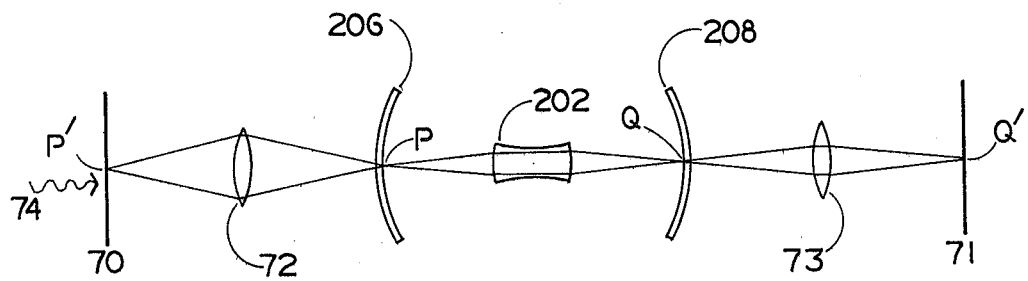
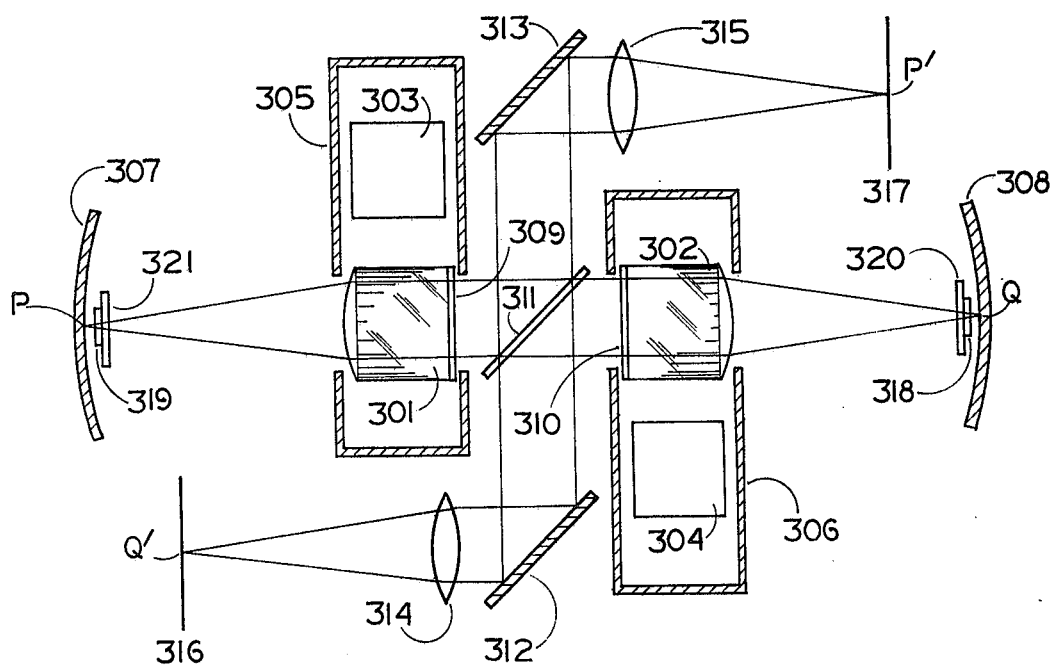
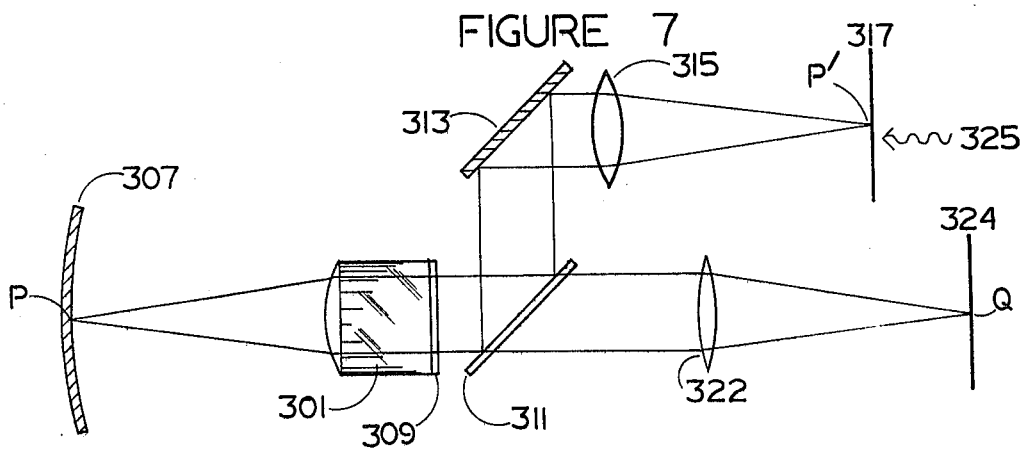

MULTI-MODE THRESHOLD LASER

CROSS REFERENCES TO RELATED APPLICATIONS

This application is a continuation-in-part of application Ser. No. 543,173 filed Jan. 22, 1975, now abandoned, which is a continuation of application Ser. No. 398,332 filed Sept. 18, 1973, now abandoned which is itself a continuation of application Ser. No. 117,784 filed Feb. 22, 1971, now abandoned which is in turn a continuation of application Ser. No. 720,262 filed Apr. 10, 1968, now abandoned.

BACKGROUND OF THE INVENTION

This invention relates to oscillators and particularly to multi-mode lasers in which the mode of oscillation is selected by an optical input signal for the purposes of contrast enhancement of projected optical images and performing threshold operations on optical matched filter output images.

Contrast enhancement is a basic image processing operation in which low image values (e.g., low intensity) are transformed to lower values and high image values are increased so as to render objects more easily visible when depicted in low contrast. In an extreme case, all picture values less than a certain threshold value are reduced to zero and picture values greater than this threshold are increased to the maximum possible value. This is called a "threshold operation" and finds extensive use in sharpening blurred images of printed characters and in optical information processing. Contrast enhancement has been carried out in prior art image processing by many devices and techniques including photographic methods based on special high contrast films and developers, and video methods based on manipulations of the electrical signals produced at the output of optical detectors.

In order to describe the use of threshold operations in optical data processing, it is desirable to first briefly review the uses of optics in data processing. For this purpose, only those computing methods in which optics performs the bulk of the computations need be discussed. The uses of optics for specialized tasks such as input-output, memory, etc. are omitted.

Optics has been used in data processing in two quite distinct ways. In the first branch of optical computing, computations are effected when optical beams which represent numerical quantities analogically are passively combined, attenuated or altered in phase. Typically, these operations are organized in a highly parallel fashion. Each point of an optical image may be processed simultaneously to achieve an extremely high data rate. In some schemes, the attenuation of the information-bearing beams may be controlled by a photochromic absorber which alters its optical density in response to a second light beam. An example of this art is given by C. Carlson in U.S. Pat. No. 3,085,469.

Although incoherent light can be used in these representations, the most effective devices require the use of coherent light. A recent summary of results in this field has been given by L. Cutrona, *IEEE Spectrum, Vol.* 1, p. 101, Oct. 1964. Particularly significant is the use of holographic coherent optical techniques to synthesize complex valued spatial filters. Holograms have been described by R. Collier in an article in *IEEE Spectrum, Vol.* 3, p. 67, July 1966. In spatial filtering, an image representing the cross correlation of an input image with a fixed filter response function is formed. The bright points of this image with intensity exceeding a certain threshold value indicate the existence and location of specific patterns in the input image. These bright points can be determined by application of a threshold operation to the correlation image. If the spatial filter is a matched filter, the brightest point in the output image indicates the most probable location of the matched signal. The brightest point can be located by a series of threshold operations of decreasing level, decreasing to that threshold value which is exceeded by just one point.

Since these coherent light devices are passive and typically linear, they are very limited in the types of data processing operations which they can perform without conversion to another media. Use of photographic film precludes real time operations and conversion to an electrical format causes loss of parallelism severely reducing data processing rates. Technically, this first branch of optical computing is greatly concerned with diffractive processes since the manipulation of coherent light to obtain the extremely high resolution and data storage density is strongly affected by diffraction. High resolution promotes high data processing rates since each resolvable point of the input optical image is processed in parallel as a separate channel.

The second branch of the optical computing art uses optics to control the generation of light so as to effect computational processes. Since this control typically results in an amplification of optical energy, the devices used in this branch are said to be active. Incoherent light can be used; however, the most powerful techniques involve the control of the generation of light emitted by lasers. These coherent light sources were first described by A. Schawlow and C. Townes, *Physical Review, Vol.* 112, No. 6, p. 1940, Dec. 1958. Lasers consist of an active optical element placed in an optically resonant cavity. When suitably pumped, the active element becomes capable of amplifying optical radiation thus compensating for losses in the cavity. Optical oscillations ensue which produce the laser output as they are emitted from the cavity. Typically, a laser output is of a particular sharply defined optical frequency, i.e., temporally coherent. A general summary of laser technology may be found in the book *Laser-Light Amplifiers and Oscillators* by D. Ross, published by Akademische Verlagsgellschaft, Frankfurt am Main, 1966. A later English edition is also available.

Prior art devices in this branch do not have a high degree of parallel action. Usually, each separate device processes only one information channel and is expected to achieve a significant computational result only when many thousands of such devices are combined or when each acts sequentially in a serial fashion. Furthermore, since lasers tend to be bistable devices (either all on or all off), most applications in this branch are adapted to a digital form of computation in which numerical quantities are represented by several optical channels each realizing one binary bit as "0" or "1" according to whether it is "off" or "on".

Some recent results in this branch of optical computing have been given by C. Koester and also by W. Kosonocky both in the book *Optical and Electro-Optical Information Processing*, ed. by J. Tippett, et al, published by M.I.T. Press, 1965. Koester shows how the generation of laser light may be controlled optically by controlling the gain of the active element. Kosonocky shows how the control may be achieved by affecting the losses in the cavity. He places a saturable absorber in the cavity of sufficient optical density to inhibit laser oscillation. A saturable absorber is an absorbing material which can be bleached by light action. An optical input signal over a certain threshold intensity bleaches the saturable absorber, reduces attenuation and allows the laser to oscillate. In some cases, the lasers were allowed to have 2 or 3 distinguishable types of laser oscillation (modes) in the same body each mode acting as a separate independent light source. The reference shows how the oscillations of these modes can be controlled separately by a combination of the techniques mentioned above. Since the controlled light is usually much brighter than the controlling light, an input-output gain greater than unity is usually achieved.

Since the control of light by alteration of the attenuation of a saturable absorber plays an important role in this disclosure, a more detailed explanation of the usefulness of the saturable absorber in the Kosonocky device will be given here. It has already been mentioned that laser mode oscillations are basically bistable and hence oscillation can be theoretically controlled by injecting light into a non-oscillating mode and increasing the intensity until oscillation begins. However, in order to get this behavior, the injected radiation must match the stimulated mode exactly in frequency, polarization and spatial distribution. The match in frequency is particularly difficult because it must be within the width of one resonant cavity mode. Since the frequencies of cavity modes are substantially changed by the slightest variation in cavity parameters, it is not even sufficient to use light from another laser of the same type. For these reasons, mode control by mere injection of radiation has not been reduced to practice. The introduction of the saturable absorber solves the problem since the bleaching radiation need not be related in any way to the laser mode frequency. The saturable absorber also serves to force the state of oscillation to be bistable since it is bleached completely as soon as the laser begins to oscillate and the intensity of oscillation rises to its maximum value.

It has been seen that threshold operations are involved in both branches of optical computing. In the first branch, a threshold operation is needed to indicate high correlation values and indicate pattern recognition. Yet the equipment itself, with its passive parallel nature, cannot supply this action. In the second branch, the threshold action is inherent in the laser devices themselves, yet it is used only to enforce a bistable action on laser oscillation to mark a "0" or a "1" in digital serial systems with little parallel computing capability.

The divergence of the two branches of optical computing is clearly evident on comparison of the article by L. Cutrona with the article by T. Bray, both of which appear in the book *Optical and Electro-Optical Information Processing* previously referred to. The article by Bray deals with the gain and the smallness of the optical elements but nowhere mentions resolution or diffraction. The article by Cutrona is concerned mainly with diffraction by large passive elements and the laser appears only as a steady source of coherent light.

Numerous advantages of basing entire computational systems on optics have been cited, for example by O. Riemann in the book referred to in the previous paragraph. Bray also gives several advantages of an all-optical approach, especially the parallel action mentioned above. However, later studies have concluded that optics could be of use in general purpose computers only in specialized roles such as input-output, memory, etc. See, for example, the article by W. V. Smith in *Applied Optics,* Vol. 5, No. 5, p. 1533, Oct. 1966. A possible reason for failing to achieve the advantages of all optical information processing is the lack of optical computing devices which combine the advantages of parallel processing with the controlled amplification of light (i.e., which merge the two branches of the optical computing art) and which manifest the threshold action needed by the first branch and suppliable by the second.

Some devices have been described which tend to bridge this gap. They involve control of laser generated light in a large number of separate channels. Each channel is realized by a separate mode of a multi-mode laser. As explained by Schawlow and Townes, op. cit., optical cavities naturally oscillate in many thousands of distinct modes distinguishable in frequency or direction of propagation or both. Commercially available lasers which serve as coherent light sources oscillate in only one or a few modes because all others (but these few modes) have been suppressed by artfully reducing their gain. In optical scanning, it is desirable to have multi-mode lasers which oscillate equally well in a large number of independent modes, each mode acting as a separate source for one direction of a scanning beam. For this purpose, the modes should be degenerate, i.e., have equal gain.

Multi-mode lasers can also be used as image amplifiers when each point of the image is coupled into a separate mode of a suitably pumped laser. In discussing image amplifying lasers, modes are considered distinguishable only if they have spatially distinguishable wave fronts of different shape or different direction. Modes of the same shape and direction are grouped together since they amplify the same image point. Even with this relaxation of the mode definition, such image amplifiers tend to be impractical since they require precise injection into a cavity mode if substantial gain using repeated (resonant) passage through the active material is to be achieved.

A practical image amplifying laser is described by W. Hardy in the *IBM Journal of Research and Development,* Vol. 9, No. 1, p. 31, Jan. 1965. In this laser, each mode of a multi-mode laser separately amplifies one point of an optical image as given by a transparency placed in the cavity. The intensity of the oscillation of the mode associated with a given point increases with the transmission of that point. This is called active optical imaging. The output of this device is given in terms of optical radiation but the input is a transparency.

A similar but more powerful active imaging device was described by R. Meyers, et al, in *IEEE Journal of Quantum Electronics,* QE-10, p. 270, Aug. 1966. The same laser has been used by R. Pole in a laser scanner in which the direction of the scanning beam is determined by the selection of the mode of oscillation which is controlled by an electro-optic modulator in the cavity. This scanner is described in the book *Optical and Electro-Optical Information Processing* previously referred to. In *Applied Optics,* Vol. 6, p. 1571, Sept. 1967, Pole has shown how an optical data processing system called "reactive information processing" can be implemented by placing a transparency in the multi-mode cavity mentioned above. In this system, the modes of the laser which are influenced by the information input are non-oscillating modes so this approach leads back to the passive coherent optical computing branch previously discussed.

These laser devices of Hardy, Meyers and Pole (intermediate between the two branches of optical computing) are active in nature, have parallel computing organization and have optical radiation as the output but, since they do not have optical radiation as an input, they cannot provide a threshold action on optical beams or projected optical images obtained from passive coherent optical data processors. Nor can they be combined with each other to form all optical computing systems because their input and output signals are incompatible.

SUMMARY OF THE INVENTION

A multi-mode threshold laser is an optical data processing component which provides a large number of active optical threshold elements which can act simultaneously in parallel in response to optical input signals to produce optical output signals. The output is compatible with the input in coherence and frequency. This invention consists of a multi-mode image amplifying laser modified by including a saturable absorber material in a part of the cavity that will permit control of each mode separately.

The cavity of the multi-mode laser must have many independent, degenerate, spatially separated modes in the sense that for each mode there is some region of the cavity in which that mode has high intensity when oscillating and all others have very low intensity. Such regions may exist in the focal plane of focusing elements in the cavity. The multi-mode lasers described by Hardy (op. cit.) and Pole (op. cit.) have a region of spatial separation on the surfaces of the reflecting mirrors bounding the cavity and satisfy the requirements for the laser used in constructing the disclosed invention.

The saturable absorber is introduced into the cavity in the region of spatial separation, e.g., as a film in the focal plane of intercavity focusing elements. The initial unbleached optical density of this saturable absorber is adjusted so that no laser oscillations occur at the operating pumping rate unless an optical input signal exceeding a certain threshold intensity enters the cavity and causes bleaching of the saturable absorber. Or the pumping rate may be adjusted to the same end. If the input radiation exceeding the threshold is directed to bleach just that saturable absorber blocking some specific selection of modes, then just that selection of modes will oscillate and no others. The state of oscillation of the modes is bistable. Radiation from oscillating modes furnishes the output.

For some laser-saturable absorber combinations, the output intensity can be made greater than the input so that an input-output gain greater than unity is obtained. In this invention, a higher gain is obtained by injecting the radiation, essentially incoherently, into those modes which are to be stimulated into oscillation. Such injected radiation is then substantially amplified by the active element and has a substantially larger effect on the saturable absorber. Also, the injected radiation bleaches just that saturable absorber blocking the modes into which it is injected and no others. Since the input radiation acts only on the saturable absorber, it need not match a cavity mode exactly so that this injection is easily reduced to practice. For example, for the image amplifying lasers of Hardy and Pole, the injection system is just the means ordinarily used to project the amplified image but used in reverse.

This amplification is aided by cavity resonance so the laser acts as a regenerative amplifier. The increase in gain due to bleaching above the threshold level rapidly leads to saturation at a level determined by the pumping rate. The bistable action of the modes may thus be described by either of the terms "saturation of a regenerative amplifier" or "oscillation of a resonator".

Suitable adjustments of pumping rate will insure that only those few modes with the largest input signals will oscillate. In certain embodiments in cavities supporting traveling wave modes, only the mode with the maximum input signal will oscillate. Embodiments in retro-reflector cavities may support either standing wave modes or traveling wave modes.

The multi-mode threshold laser has utility for extreme contrast enhancement of projected optical images, threshold operations in optical information processing, selection of the maximum points of optical matched filter output images, and as a naturally formed collection of optical logic elements used in parallel optical computing. This invention is not expected to be useful in computers with a serial organization.

The term "mode" as used in describing this invention refers to the collection of spatially indistinguishable modes of the same wave shape and orientation, of any optical frequency within the active material line width. Cavity modes not spatially distinguishable are not separately controlled by the saturable absorber and are therefore identified and grouped together as one mode. A mode (i.e., spatially distinguishable mode) is said to oscillate if any of its cavity modes oscillates. When an optical beam matching the wave shape and orientation of a mode (but not necessarily matching the frequency of any of its cavity modes) enters the laser cavity, it is said to be injected into that mode.

A precise yet natural definition of "multi-mode" as used in this disclosure has proved elusive. The Hardy laser (op. cit.), with 64 modes (i.e., spatially distinguishable modes), has the least number of modes of the multi-mode lasers discussed here. However, readable images of alphabetic characters can be formed with as few as 25 modes: five horizontal lines are necessary for E, B, etc., and five vertical lines are necessary for W, M, etc. In view of this, a multi-mode laser is defined to be a laser with 25 or more independent degenerate spatially separated modes and image amplifying lasers are defined to have 5 lines of resolution both vertically and horizontally. It is also understood that these modes share a common pump source so that a collection of 25 or more separate lasers or lasing optical fibers is excluded.

The disclosed invention differs from the multi-mode lasers of Hardy, Meyers and Pole in that those lasers have no saturable absorbers in the parts of the cavity in which the modes are separated and, also, oscillation of the modes is not controlled by an optical input signal. Considered as a device for contrast enhancement, the disclosed invention differs from the above lasers in that for those lasers the image to be enhanced must be physically inserted into the cavity as a transparency whereas, in the disclosed invention, the image is projected optically into the cavity onto a saturable absorber material. The same remarks apply to the reactive information processing system described by Pole. The disclosed invention is also similar to the information processing devices using photochromic films as described by Carlson; however, the latter devices have no laser. Although the disclosed invention has an optical image input and does amplify optical radiation, it is distinguished by its threshold action and bistable output from image amplifying lasers.

The disclosed invention differs from the optical logic elements described by Koester and by Kosonocky in that those lasers are not multi-mode (in the above defined sense) and have no image processing capability. Nor does amplification of the optical input signal by resonance in the laser cavity have any role in the Kosonocky or Koester devices.

Comparison of the disclosed invention to a collection of 25 or more such separate optical logic elements is a more difficult question. The multi-mode threshold laser differs from such a collection in structural appearance, method of manufacture and in the function which it performs. Since the modes of a multi-mode threshold laser share a common pump source, its computing action will be different from a collection of lasers with separate pump sources. The number of modes which oscillate is limited by the pumping rate in the former but not in the latter. In certain computing schemes, such a limitation could be desirable. It is usually more expedient to manufacture one item which will serve 25 or more separate purposes than to manufacture 25 separate items. In general, the multi-mode threshold laser bears the same relation to a collection of 25 or more separate threshold lasers as an image forming lens bears to an image transmitting collection of optical fibers.

BRIEF DESCRIPTION OF THE DRAWINGS

FIG. 5 shows a means for focusing an optical image on the saturable absorber film of the second embodiment.

FIG. 6 shows a third embodiment of the multi-mode threshold laser.

FIG. 7 shows a technique for equalizing the gain of the modes of the laser used in the third embodiment.

DETAILED DESCRIPTION OF THE INVENTION

Figure 1:
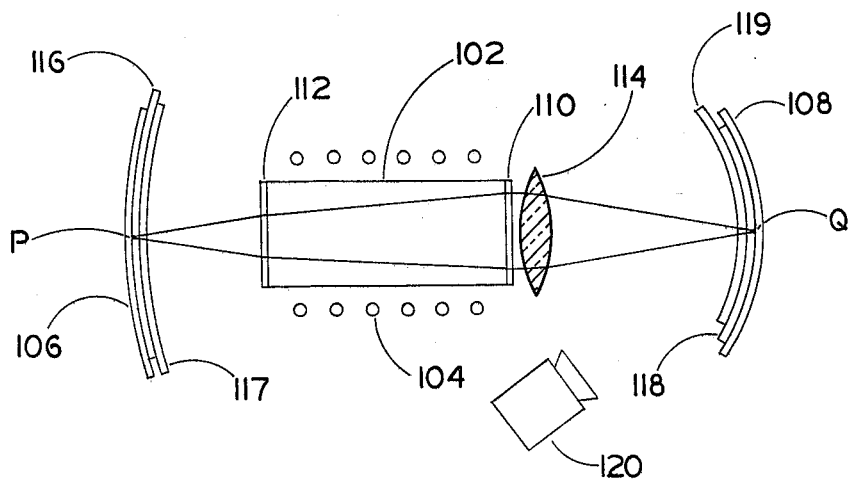
FIG. 1 shows a specific embodiment of the multi-mode threshold laser.

Since multi-mode lasers are an important component of this invention, their basic characteristics will be briefly reviewed in order to establish the terminology used in this disclosure. Every optically resonant cavity formed by mirrors, end reflectors and the like has many possible modes of optical oscillation, typically $10^8$ modes or more. The cavity can oscillate in any mode independently of other modes. The cavity can oscillate in any possible combination of modes and every possible oscillation is a combination of modes. In the cubic cavity formed with six equal square mirrors, each mode is a plane wave of particular orientation bouncing back and forth inside the cube.

An oscillation started in a mode will naturally decay due to loss of energy from the mode by absorption, leakage from the cavity, etc. Each mode has a loss rate associated with it and different modes will typically have different losses.

When energy leaks out of the cavity, each mode produces a characteristic distribution of energy outside the cavity. For example, if the cubic cavity has a partially reflecting wall, a mode oscillating inside the cube will cause a plane wave to emanate from this wall with a specific orientation related to the orientation of the plane wave mode inside. Similarly, if such a plane wave is incident on the partially reflecting wall, it will cause a plane wave of corresponding orientation to propagate into the cube and set up an oscillation in the corresponding mode. Radiation incident on any cavity will start oscillations in one or more modes and suitable incident optical beams will inject energy into just one mode and no others.

When an active material (lasing material) is placed in the cavity and pumped, an amplification (or gain) occurs which may compensate for losses and cause sustained oscillations. A laser is thus obtained and the modes of the laser are those of the cavity. The most coherent light is obtained from the laser when only one mode oscillates since if two or more modes oscillate simultaneously and independently, their optical outputs are not necessarily coherent with each other. Cavities designed for typical commercial lasers which serve as sources for coherent light usually are formed to have large loss rates for all modes except one, so that only one mode oscillates at a time. However, with increasing pump power, even these cavities tend to break into multi-mode oscillation. For certain purposes such as optical scanning, multi-mode lasers have been found useful and, for this purpose, cavities have been designed with a very large number of similarly shaped modes of nearly equal loss rates. Such modes, and the cavity, are said to be degenerate. Lasers using these degenerate cavities can oscillate equally well in any of a large number of modes but only in some modes at any one time. The higher the pump power, the more modes will oscillate. This action results from the distribution of input pump energy among the modes.

Some multi-mode cavities possess an additional property that is very useful: there is for each mode some region of space in the cavity where that mode has a high average intensity and all other modes have low intensity. The modes are then said to be spatially separated in the cavity and the cavity is said to have spatially separated modes. Such conditions arise, for example, in cubic cavities if a pair of lenses are added to focus the plane waves to a point and then reproject the point disturbance as a plane wave. The modes of the cubic cavity are thus said to be spatially separable.

Such cavities are useful because they permit the losses of the modes to be individually controlled. For example, by introducing absorption at the spatially separated points in all modes except one, oscillations in all other modes are suppressed. When a cavity having spatially separated modes is used in a laser, the laser is said to have spatially separated modes. By controlling the absorption in the region of mode separation, a multimode laser with spatially separated modes can be caused to emit beams in various controllable directions and thus may be useful for scanning.

The laser cavity chosen for use in the disclosed invention should have many degenerate spatially separated modes. Only modes which have wave fronts of distinct shape or orientation (like transverse modes) are counted as distinct modes. Modes that differ only in frequency (like longitudinal modes) do not count as distinct modes. Fortunately, these laser cavity requirements are essentially the same as those which apply to multi-mode scanning lasers and image amplifying lasers, so laser cavities developed for these applications should also serve well in the disclosed invention.

In these devices, as well as in the disclosed invention, longitudinal (axial) modes of the same wave shape and orientation differing only in frequency and polarization are identified, or grouped together, to form one (composite) mode. The modes thus formed are said to be spatially distinguishable since they are distinguished from each other only by wave shape rather than frequency. Such a mode is said to oscillate if any of its cavity modes oscillates. The gain of a composite mode is the gain of its axial mode with the highest gain. Composite modes are degenerate if they have the same gain, and are independent if each one may oscillate without inducing oscillation in the others. Composite modes are spatially separated if their cavity modes are spatially separated. Other terminology related to laser modes may be applied to composite modes with an implied definition.

The definition of composite mode given above renders precise the concept of controlling mode oscillation by introducing an absorber into the cavity which affects all frequencies in the laser line width equally. In that case, axial modes differing only in frequency could not be individually controlled, but spatially separated composite modes can be individually controlled by absorption in the region of spatial separation. Also for the purposes of optical image processing, the small difference in frequency between axial modes is not significant but the differences in wave shape between composite modes can be used in representing image information. The intensity or amplitude of a composite mode oscillation may represent the value of an image point.

The disclosed invention should be constructed in a laser cavity with 25 or more independent degenerate spatially separated composite modes. The reasons for having at least 25 modes have been mentioned previously. In the remainder of this disclosure, the term mode will refer to a composite mode unless specified as an axial mode or a cavity mode. The term multi-mode will refer to 25 or more (composite) modes as described above.

In operating the disclosed invention, input optical radiation is injected into a mode or modes of the multimode laser. The method of injecting this signal is as follows: (a) the frequency of the input radiation should be within the gain profile of the active material of the multi-mode laser; (b) the shape of the input waves should be the same as the shape of the output waves of the mode of the multi-mode laser into which the radiation is to be injected; (c) the polarization of the input should match the polarization of the output waves of that mode and (d) the direction of propagation should be opposite to that of the radiation emitted by that mode when it oscillates. These requirements are summarized by the statement that the input signals should be the reversals of the beams emitted by the modes of the multi-mode laser when they oscillate, i.e., they have the same shape but travel in opposite directions. For example, if the waves are plane waves, the reversal of a plane wave is a similarly oriented plane wave traveling in the opposite direction. Or, if the output from the laser is a diverging spherical wave diverging from point Q, then the input signal is to be a converging spherical wave converging to point Q. Conventional optical components may be used to facilitate this injection. For example, if the outputs of the laser modes are diverging spherical waves, each mode diverging from a specific point on a plane, and the input signals are plane waves, then a lens may focus the plane waves onto the given plane, thus converting the plane waves into converging spherical waves which are suitable for injection into the laser cavity.

When optical energy is thus caused to enter a laser cavity with wave shape and orientation equal to that of a (composite) mode and with frequency approximately equal to its cavity modes, the energy is said to be injected into that mode. This essentially defines the term injection (or injection into a mode) as used in describing the disclosed invention.

Difficulties may be found in producing reversed wave fronts for injection into the laser cavity if the waves emitted by the laser are not of standard optical type such as plane waves, etc. Regardless of the complexity of laser beam shape, a thick hologram can be used to create the reversed wave front.

Holograms are constructed by causing two coherent optical beams, denoted A and B, to intersect and interfere in a block of photo-sensitive material. The incident energy causes changes in the optical properties of the block, by development if necessary, with the greater change where the interference is constructive. When one beam, say A, is removed, the other, B, is partially diffracted by the hologram so as to reproduce that part of the beam A which traversed the hologram as it was constructed. Thus the hologram converts beam A into beam B. The hologram also converts a reversed beam A into a reversed beam B. To apply this to mode injection, let beam B be the radiation emitted by a laser mode and let beam A be a coherent plane wave obtained (through a pinhole filter, if necessary) as a part of the same laser mode radiation. Then a plane wave which is the reverse of A will be injected into that mode by this hologram, when it is held in the same fixed position relative to the laser as when it was constructed.

Energy thus injected into a mode of the laser will suffer the same losses as any incipient oscillation in this mode. Part of the energy will be absorbed and part will escape from the cavity. If the lasing material in the cavity is active (has been pumped), some amplification will take place and the losses will be compensated. Thus a higher optical intensity may occur in this mode than would occur in the input signal itself. The multi-mode laser thus acts as a regenerative amplifier for the input signal. Under suitable conditions, the intensity in the mode may rise to a maximum value limited by the pump rate. Considered as a regenerative amplifier, the laser is said to be saturated. This action can also be considered as a sustained oscillation in the resonant cavity. In this disclosure, the terminology of oscillation will be employed. The conditions under which such oscillations occur in response to injected energy are quite intricate and vary greatly from laser to laser. In the disclosed invention, a saturable absorber is placed in the cavity so as to simplify these conditions to the single condition that injected energy exceed a threshold value.

A saturable absorber is a material with an optical transmission which increases with increasing intensity of incident light, i.e., the material bleaches. When a suitably dense saturable absorber is placed in a laser cavity, the loss is more than the gain, and any incipient oscillation will be extinguished. However, if a beam of sufficient intensity is injected into the laser, the absorber will be bleached and the gain of the laser will increase so that oscillations build up. The minimum intensity necessary to secure this condition provides the threshold capability mentioned above. Because the incoming radiation acts directly on the saturable absorber which in turn controls the oscillation of the laser, this threshold action is independent of the exact interrelation of the injected radiation and the natural cavity oscillation. For example, they need not be of exactly the same frequency although such frequencies should be made as close as possible. Typically, this requirement is satisfied by using a laser of the same type of active material as a source for the input as the active material used in the multi-mode threshold laser itself.

More precisely, the temporal coherence of the input radiation should ideally be such that its optical frequency spectrum matches the lasing line width of the laser used in the multi-mode threshold laser. Typical lasers having many oscillating axial modes for each direction of propagation will fulfill this requirement naturally through normal thermal and mechanical perturbations of the cavity which cause the frequencies of the oscillating axial modes to wander through the lasing line width. If the input laser should be of exceptional coherence (e.g., single cavity mode or frequency stabilized), it may be necessary to provide these perturbations. This could be done by mounting the cavity reflectors at the anti-nodes of piezoelectric crystals driven with resonant high-frequency voltage (of the order of 100 kilohertz) so as to cause rapid variation in cavity length of one-half optical wave length and thus causing corresponding variations in axial mode frequency.

The above requirement of reduced coherence is necessary to prevent any chance injection of input radiation into a proper cavity mode, thus causing oscillations to commence before the saturable absorber has been bleached in the manner previously described. If the period of vibration of the piezoelectric crystal is small compared to that in which enough optical energy is injected to cause bleaching, only a very small amount will be accepted by the axial modes and all such modes will receive amounts proportional to the optical energy injected into the (spatially distinguishable) mode to which they belong. The oscillations of the mode will then be controlled by the bleaching of the saturable absorber. In order to block the still more remote possibility of coincidence of frequencies at the extremes of the piezoelectric vibrations, the input radiation may be restricted to that produced by the source laser only during intervals of rapid motion of the crystal by an electro-optic switch which is open only at those intervals.

Strictly speaking, radiation generated by a laser perturbed as described above should be considered as partially coherent. However, this degree of coherence is adequate for operation of the prior art coherent optical devices previously referred to. In this sense, it may still be said to be coherent.

Saturable absorbers tend to return to their unbleached state when the bleaching radiation is removed. The time interval in which this return substantially takes place is called the recovery time of the saturable absorber. The shorter the recovery time, the more intense the radiation necessary to bleach the substance since the molecules are rapidly returning to their unbleached state. This means a saturable absorber with a short recovery time has a high threshold. Conversely, a saturable absorber with a long recovery time has a relatively low threshold. This indicates that higher optical power is needed for faster action and the saturable absorber should be chosen with laser power in mind.

With a saturable absorber in the cavity, it may appear that the laser would produce unwanted giant pulses of optical energy. Giant pulses will not develop because the conditions for their production will not be fulfilled in normal operation. No large excess of inversion will occur because lasers used for computing need only operate at the lowest possible power. Also, the saturable absorber used in the disclosed invention should provide only a very small transmission loss, just enough to inhibit oscillation at a very small excess inversion. Finally, operation of the laser will itself bleach the saturable absorber triggering the release of the small amount of energy stored in the active medium. Mode locking is inhibited by using saturable absorbers with long recovery times compared to cavity transit time.

For each specific optical density of saturable absorber material, there is an intensity which causes bleaching at a rate exactly equal to the tendency of the material to recover its absorption. Higher intensities cause the saturable absorber to become bleached. The equilibrium intensity (for zero absorption) can be calculated from a formula given by Ross (op. cit.). For steady state multi-mode lasers, the threshold is most naturally given as this specific value of a steady state input intensity. Once the laser has begun to oscillate, the intensity of these oscillations is usually sufficient to keep the saturable absorber bleached even though the input signal is withdrawn. The input signal can therefore be delivered in the form of an optical pulse measured in terms of its energy. If the pulse width is small compared to saturable absorber recovery time, the total energy requirement for bleaching can also be calculated, e.g., from another formula given by Ross (op. cit.). The threshold requirement on the input signal can thus be specified in terms of either intensity, energy, or in other ways depending on the time-varying characteristics of the input signal.

The threshold given in the previous paragraph applies to the case in which the laser is pumped to have a gain of unity when the saturable absorber is removed from the cavity, and to have a gain slightly less than unity with the saturable absorber in the cavity. With no input signal and with the saturable absorber in the cavity, the laser does not oscillate because the gain is less than unity and incipient oscillations die out. When the absorption is removed by bleaching, the gain becomes unity and oscillations commence.

If the laser is pumped to a higher level of inversion but not so high that a gain of unity is obtained with the saturable absorber in the cavity, then the threshold is reduced from that previously calculated. For example, let the initial saturable absorption be $s$ and suppose that $g = 1 - s/2$, i.e., without the saturable absorber the gain would be $1 + s/2$. Then the threshold is that input for which the intensity on the saturable absorber balances an absorption of $s/2$. If the input is less than this, the absorption is greater than $s/2$ and the gain is less than unity, but if the intensity is more than this, the absorption is less than $s/2$ and the gain is greater than unity. Oscillations commence and the intensity on the saturable absorber is increased leading to more bleaching and still higher gain, thus reinforcing the oscillating condition and insuring a bistability for mode oscillation.

No threshold effect is observable if the inversion level is such that gain in the laser, including losses due to saturable absorption, is greater than unity. Then the laser oscillates regardless of the input signal. Clearly, the pumping rate should be adjusted to give over-all mode gain (including saturable absorption) between unity and $1-s$ where $s$ is the initial saturable absorption.

The use of saturable absorbers in single mode lasers to achieve threshold discrimination has been described by W. Kosonocky, U.S. Pat. No. 3,270,291. The disclosed invention applies this technology to multi-mode lasers. In multi-mode lasers, the saturable absorber is placed in the regions in which the modes are spatially separated. For example, in the cubic cavity with a pair of lenses, the saturable absorber is placed in the common focal plane. Thus, incoming radiation that is injected into just one mode bleaches only the saturable absorber in the region of space characteristic of that one mode so that it controls the oscillation of just that one mode. When thus provided with saturable absorber in the spatially separated regions, the multi-mode laser is called a multi-mode threshold laser.

In a multi-mode threshold laser, the saturable absorber promotes a uniform threshold in the modes while maintaining a reasonably high sensitivity to input radiation. An attempt to secure a very high sensitivity by coupling the input coherently into a single cavity mode would require an exact frequency match with possibly different frequencies required in each separate cavity mode. The input signal threshold would be determined largely by the degree of frequency match and would vary erratically from mode to mode. Alternately, if coherence was reduced to fill out all frequencies in the laser line width (as described previously but without the saturable absorber), most of the energy would not enter any axial mode and the coupling would be very small. The saturable absorber acts to absorb this frequency mismatched radiation and uses it to control the modes uniformly since it absorbs uniformly in each mode.

When an input signal is injected into a mode of a multi-mode threshold laser, an intensity (or energy) above a certain threshold value will stimulate that mode into oscillation. The thresholds are affected by the mode gain, saturable absorber density and the ambient light falling on the saturable absorber. This light may be generated by fluorescence of the active material, by the pump source or by other sources. Fluorescence of the lasing material will tend to reduce the threshold, but other sources such as leaking pump light may either increase or decrease it, depending on the spectral content of the light and the nature of the saturable absorber.

The input signal thresholds are jointly adjusted by adjusting the mode gain through pumping rate, by adjusting saturable absorber film optical density, and by placing attenuating filters in the cavity. The thresholds may be adjusted in value by re-scaling the input intensity, e.g., by projecting the image with greater intensity.

The thresholds of the various modes may be separately adjusted by placing (non-saturable) absorbing material in the spatially separated parts of the modes. If the gains of the modes are not equal, they may be equalized (rendered degenerate) by this procedure but, since the additional attenuation requires more total pump power for given output power, the cavity should be chosen with mode gains as nearly equal as possible.

Because the modes share a common pump source, the gain in individual modes (and hence the input signal thresholds for these modes) is affected by the oscillations of other modes. When applying a threshold operation with a fixed threshold, this effect is detrimental and will require compensating steps described below. When finding the maximum point in an input image, this effect is useful. It tends to suppress oscillation in more than one mode by reducing gain in other modes as soon as one mode oscillates, thus allowing higher power single mode oscillation. This exemplifies control of laser action by affecting mode gain. Thus, the multi-mode laser uses both techniques described by Koester and Kosonocky in the book *Optical and Electro-Optical Information Processing* previously cited.

The pumping means used to activate the amplifying material in the laser is generally not relevant to this invention except that the pumping rate should be controllable so that the gain in the cavity modes can be simultaneously controlled. For optical pumping by flashlamps, the total pulse energy should be controllable. Although a laser can be designed and constructed from laser handbooks such as Ross (op. cit.), it is recommended that the cavity, laser amplifier and pump source be specified as given in this disclosure and purchased from a reliable laser manufacturer. However, before attempting to couple the multi-mode laser to the input, the action of the pump source, the buildup of oscillations, the relaxation oscillations, if any, and the decay of oscillations should all be well understood.

Many substances may serve as saturable absorbers for use in the disclosed invention. Most commercial dyes bleach to some extent and thus are saturable absorbers. Photochromic materials are darkened by some wave lengths of light and bleached by others so they are also available as saturable absorbers. The same medium used in the laser for amplification may act as a saturable absorber when left unpumped. Many saturable absorbers have been developed as passive Q-switches for giant pulse lasers.

The amount of saturable absorption in the mode is determined by the density of saturable absorber in the mode volume. If the saturable absorber is a thin film of dye in the focal plane of an imaging device, the density of absorber in any one mode depends on the film thickness and dye concentration. The matrix holding the dye (e.g., solvent) also has a substantial effect on the optical properties of the absorber. Typical absorption of the saturable absorber is about 2% for use in a multi-mode threshold laser. Too much saturable absorption requires excessive laser gain and tends to produce giant pulses, whereas too little saturable absorption tends to cause premature mode release due to bleaching by laser fluorescence and other noise sources.

The use of a very low saturable absorber density (typically 2% absorption) greatly reduces the pump power required to attain oscillations and prevents the high inversion densities which might cause giant pulses, but it may appear that this low saturable absorber density would produce a concomitant low sensitivity to input signal radiation since only a small amount of radiation would be absorbed and be effective in bleaching the saturable absorber. This tendency to inefficiency is forestalled by injecting the input radiation into the modes of the multi-mode laser as described above. A complete compensation for the low saturable absorber density is obtained in this way. To show how this compensation is realized, assume that the multi-mode threshold laser has been pumped just enough to cause oscillations if the saturable absorber were removed. Let the net cavity gain in a typical mode be $g = 1 - s$ where $s$ is the saturable absorption in that mode. Let $P_o$ be the incoming signal radiation power injected into that mode. On the first pass, $P_o$ watts illuminates the saturable absorber in that mode. Unabsorbed radiation is transmitted through the absorber and is returned by the cavity to the saturable absorber but now of power $P_o g$. A third pass adds $P_o g^2$ watts, etc. Because of cavity gain, there is no loss of power except in the saturable absorber. After a very short interval of time, the total power incident on the saturable absorber is $$P_1 = P_o + P_o g + P_o g^2 + P_o g^3 + \ldots = P_o(1 + g + g^2 + g^3 + \ldots) = P_o/(1 - g) = P_o/s.$$

Since the total amount of radiation absorbed by the saturable absorber is $$P_1 s = (P_o/s)s = P_o$$

the amount of absorbed power is independent of saturable absorber density and all input radiation is effectively absorbed by the saturable absorber.

Note that the addition of optical radiation on the absorber is in terms of intensity, or power, not amplitude. If the signal was injected exactly into a cavity mode, the radiation on the second pass would be coherent with the first pass, the addition would be in terms of amplitude and a much greater intensity could be built up at some points in the cavity. As stated previously, it is very difficult to coherently inject radiation precisely into a cavity mode and this is neither necessary nor desirable in the disclosed invention which utilizes injection with reduced coherence requirements as previously described.

It should be noted that the signal to noise ratio of the laser considered as a detector is not improved by this amplification process. The dominant noise is due to the fluorescence, or spontaneous emission, of the lasing element and this is also amplified by exactly the same process. This amplified fluorescence will be incident on the saturable absorber and will act to lower the input signal threshold in every mode. The effect of the noise, or stochastic variation, in this fluorescence is to cause unreliable operation: occasionally modes near, but not above threshold, will oscillate.

Once a mode of the multi-mode threshold laser begins to oscillate, it will tend to further bleach the saturable absorber in that mode. The intensity in mode oscillation is typically much greater than the intensity of the injected input signal radiation even allowing for amplification. Therefore, when a mode oscillates, the saturable absorber in that mode will typically be held at complete transparency. The oscillating modes will all have almost exactly the same radiant intensity because the modes are degenerate. The intensity of mode oscillation thus provides no information. The output of a multi-mode threshold laser is given entirely in terms of the selection of the modes which oscillate in the computing cycle. Also, the state of oscillation of each mode is bistable. Thus modes may serve as optical logic elements as well as standard indicators of correlation peaks.

The following paragraphs will describe the manner of using the multimode threshold laser. To enhance the contrast of an image, each point of the image is projected into a different mode of the multi-mode laser. The projection intensity and the laser pumping rate are jointly adjusted so that some modes corresponding to brighter image points oscillate whereas other modes corresponding to less bright image points do not oscillate. The light emitted from te multi-mode threshold laser represents a very high contrast version of the input image.

To use the multi-mode threshold laser for finding the brightest point of an image (such as the output of an optical matched filter), the points of the image are coupled to the modes of the multi-mode laser. The pump rate or the projected intensity is increased until just one mode oscillates. This mode corresponds to the point of maximum intensity (or to the point of "best match" of the matched filter). Similarly, the brightest two, three, etc. points can be located.

To apply a specific threshold to a projected optical image (such as the output of an optical correlator), the image is again coupled into the cavity so that each point corresponds to one mode, but one special mode (the control mode) is coupled to a fixed source not part of the image. The intensity of this source is adjusted to the desired threshold intensity. The pumping rate is then increased until the control mode oscillates. Those other modes which are then oscillating correspond to image points exceeding the threshold.

To use the multi-mode threshold laser as a naturally formed collection of optical logic elements, input beams are needed which are suitably coded to represent logical, or Boolean, variables. Boolean algebra is a branch of mathematics which shows how logical deductions may be performed algebraically. See, for example, the text *Applied Boolean Algebra* by F. E. Hohn, published by the MacMillan Co., N.Y., 2nd edition, 1966. A beam $B_1$ may represent a Boolean variable $p_1$ in the sense that if $B_1$ has no intensity then $p_1 = 0$ (or $p_1$ is FALSE) and if $B_1$ has intensity equal to a certain standard intensity then $p_1 = 1$ (or $p_1$ is TRUE). To realize the Boolean sum $p_1 + p_2$ (the logical OR), the beams representing $p_1$ and $p_2$ are combined (incoherently) and injected into a mode $M_1$ of the multi-mode threshold laser. The threshold is set at 50% of the standard intensity. Then mode $M_1$ will oscillate if either $p_1 = 1$ or $p_2 = 1$, otherwise not, so that the output of $M_1$ realizes the Boolean sum $p_1 + p_2$, since mode oscillations are bistable and all oscillating modes have the same standard intensity. To realize the Boolean product $p_1 p_2$ (the logical AND), the beams representing $p_1$ and $p_2$ are combined and injected into a mode $M_2$ of the multi-mode threshold laser with threshold set at 150% of the standard intensity. Then $M_2$ will oscillate if both $p_1$ and $p_2$ are equal to 1, otherwise not, thus realizing the Boolean product $p_1 p_2$.

Similarly, the sum of any number of variables can be evaluated by combining their representing beams and injecting the combined beam into a mode of the multi-mode threshold laser. The product of any number of variables can be evaluated in the same way except that the threshold must be increased so that it will be exceeded only if all variables in the product are equal to 1.

For example, for the simultaneous product of 10 variables the threshold would be set at 9½ times the standard intensity. A limiting factor is that this threshold must be set quite accurately when the number of variables becomes large. The threshold can be effectively increased by attenuating the injected signal so that all operations will achieve their correct thresholds with the same pump rate.

Since there is no provision in the multi-mode threshold laser to selectively quench modes once oscillating, there is no direct method of forming negations. This difficulty may be obviated by considering the negation of $p$ of a variable $p$ as another variable. Then the input must provide $p$ along with $p$ and the beam representing $p$ will be of zero intensity whenever $p$ is at standard intensity and conversely. Thus, a Boolean variable would be represented by the pair (1,0) if it is equal to 1 or by the pair (0,1) if it is zero. The Boolean formulae which are to be evaluated are then reduced by algebraic manipulations so that all negations apply to the input variables and not to any intermediate result. In particular, all functions may be reduced to certain standard forms such as the disjunctive normal form, which are evaluated by first performing all negations (on the input variables), then performing all products and finally forming all sums. See, for example, Hohn's book cited above. A particular example of a function in the disjunctive normal form is $$f(p_1, p_2, p_3, p_4) = p_1p_2p_3p_4 + p_1p_2p_3p_4 + p_1p_2p_3p_4 + p_1p_2p_3p_4.$$

To evaluate this function, no negations need to be performed since negations of variables are already available. A similar form express $f$, the negation of $f$, and this form must also be evaluated if a second stage of negation free processing is required.

Although the collection of optical logic elements provided by the multi-mode threshold laser can thus handle all basic Boolean functions, it has an important limitation. Because modes cannot be selectively quenched, there is no way to repeatedly evaluate the same function with different input values, except by turning off the pump source and quenching all modes. This limitation precludes the use of the multi-mode threshold laser to provide the collection of logic elements for construction of a conventional serial digital computer. However, the disclosed invention may be used to evaluate Boolean functions in a parallel fashion. The various modes may represent the values of different Boolean functions which are to be simultaneously evaluated, each mode representing a different function. The input signals are applied as described above and when a stable pattern of mode oscillation evolves the computation is complete, the results are read out and the pump turned off (quenching all modes) so that a new computing cycle with new input data can begin.

In a purely parallel computing scheme, the only significant condition is the changed state of the logical element from the beginning to the end. The exact times in the computing cycle at which the changes take place have no computational significance. If all the modes are "off" at the beginning, then the only significant condition is the selection of the modes oscillating at the end of the cycle. This is completely analogous to the action of the parallel optical analog computers previously mentioned in which the output is given by an optical image all points of which are produced essentially simultaneously from the input data. Thus in a purely parallel computation, individual mode quenching is not necessary.

It is not expected that practical computational tasks can be carried out in a purely parallel fashion, but it may be expected that large blocks of parallel computation can be segregated which may be executed one after the other. For example, to evaluate Boolean polynomials in the disjunctive normal form mentioned above, all products could be evaluated simultaneously in parallel in one block by one multi-mode threshold laser. Then all sums could be evaluated simultaneously in parallel in a second block by a second multi-mode threshold laser. Since both input and output of the multi-mode threshold laser are optical beams of the same frequency, no conversion to an electrical or photographic format is needed. Also, output beams of the first multi-mode threshold laser representing Boolean variables having the value "1" all have the same intensity and thus represent Boolean variables in a manner suitable for input into the second multi-mode threshold laser. (Conventional optical techniques for supplying input signals to separate optical logic elements may be used to route the optical radiation from one multi-mode threshold laser to another, when used in conjunction with the mode injection techniques previously described.) This paragraph may be summarized by the statement that the naturally formed collection of optical logic elements offered by the multi-mode threshold laser finds utility to the extent that Boolean computations can be conveniently written in parallel form, so that lack of individual mode quenching is not a limiting factor.

The method described above for coding input beams and representing Boolean variables is only one approach to utilization of the threshold action and bistable output of the modes of a multi-mode threshold laser in forming a collection of logic elements. Other methods may also be used. For example, if the various representing beams are coherent with each other, the value "1" could be represented by a standard amplitude. Then beams could be combined coherently so that amplitudes combine additively instead of intensities.

DESCRIPTION OF A SPECIFIC EMBODIMENT

In this embodiment, the cavity will be that used by Hardy in U.S. Pat. No. 3,293,565. This multi-mode laser, intended as an image amplifier, is shown in FIG. 1 just as presented by Hardy. The laser 102 uses a He - Ne mixture pumped by means 104 and has anti-reflective coatings 110 and 112. Lens 114 images mirror 106 on mirror 108 as shown for points P and Q. A typical mode has the form of a wave diverging from a point on 106 such as P and converging to a point on 108 such as Q. Each mirror should have some transmission so energy can exit and enter the cavity at either end. The only modification is that mask 116 has spatially variable attenuation to equalize gain in the modes and is covered with anti-reflective coating 117. Added to the cavity is a saturable absorber film 118 provided with an anti-reflective cover 119. These latter anti-reflective coatings may be mounted on a "contact lens" which fits the curved surfaces of mirrors 106 and 108. The saturable absorber is photochromic material type 43–540, manufactured by American Cyanamid. This is bleached by He - Ne laser light and darkened by longwave ultraviolet light. A source of ultraviolet light 120 is provided for darkening the saturable absorber. This source must illuminate film 118 uniformly and be of adjustable intensity. FIG. 1 thus comprises a specific embodiment of a multi-mode threshold laser.

The threshold of the laser will depend on both the pumping rate and the intensity of the darkening ultraviolet light illuminating the photochromic film. The adjustments are made as follows. The saturable absorber is removed from the cavity and a filter having a transmission of 0.99 in the laser light is inserted into the laser cavity. The pump rate is increased until the laser just oscillates. This is the desired pump rate. The filter is removed and the saturable absorber is replaced. The pumping rate may be adjusted by varying the voltage of the exciting source which supplies the pump energy.

The ultraviolet light 120 is then adjusted so that the film 118 has the desired threshold. The stable density D of this photochromic film satisfies the relation $$GI = DHJ + DF$$

where I and J are the irradiances of the darkening and bleaching radiation respectively and G, H and F are constants. Typical values for G, H and F are 0.1, 5 and 0.00025 respectively when I and J are in units of watts/cm$^2$. This relation is plotted in FIG. 2 with the curves labeled according to the transmission $T = 10^{-D}$. For bleaching radiation of intensity J greater than that satisfying the above relation, the material bleaches and T increases.

The lower curve T = 0.99 corresponds to the laser threshold selected above. A typical value for the bleaching radiation due to spontaneous emission of the lasing gas is $J_o = 10^{-4}$ watt/cm$^2$. Suppose a threshold of $1.4 \cdot 10^{-4}$ watts/cm$^2$ is desired. The total value of J is then $2.4 \cdot 10^{-4}$ watts/cm$^2$ at threshold level. This value of J and the transmission .99 determine the threshold operating point B in FIG. 2, and the operating value of $I_o = 0.6 \cdot 10^{-4}$ watts/cm$^2$. The pre-signal operating point A then has coordinates $J_0$ and $I_0$ and has stable transmission .98. The ultraviolet light 120 is thus to be adjusted so that the photochromic film has an absorption of 2%, which occurs when $I = I_0$ for $J = J_o$. The bleaching action will take about 1 minute to bring the material from point A to point B when illuminated with threshold level radiation. At point B (T = 0.99), the laser mode will begin to oscillate. Thresholds of individual modes can be adjusted upwards by increasing attenuation in that part of the mask 116 corresponding to that mode.

As explained by Hardy, each mode is projected onto a circle about 2.5 times the Airy disc diameter on mask 116 and film 118. For typical laser dimensions, these mode circles will be about 0.05 cm in diameter. Allowing 1% for end mirror transmission, a beam of power no more than 0.025 milliwatts is needed to establish the threshold power density on the saturable absorber, even without allowing for amplification by the lasing material.

Figure 2:
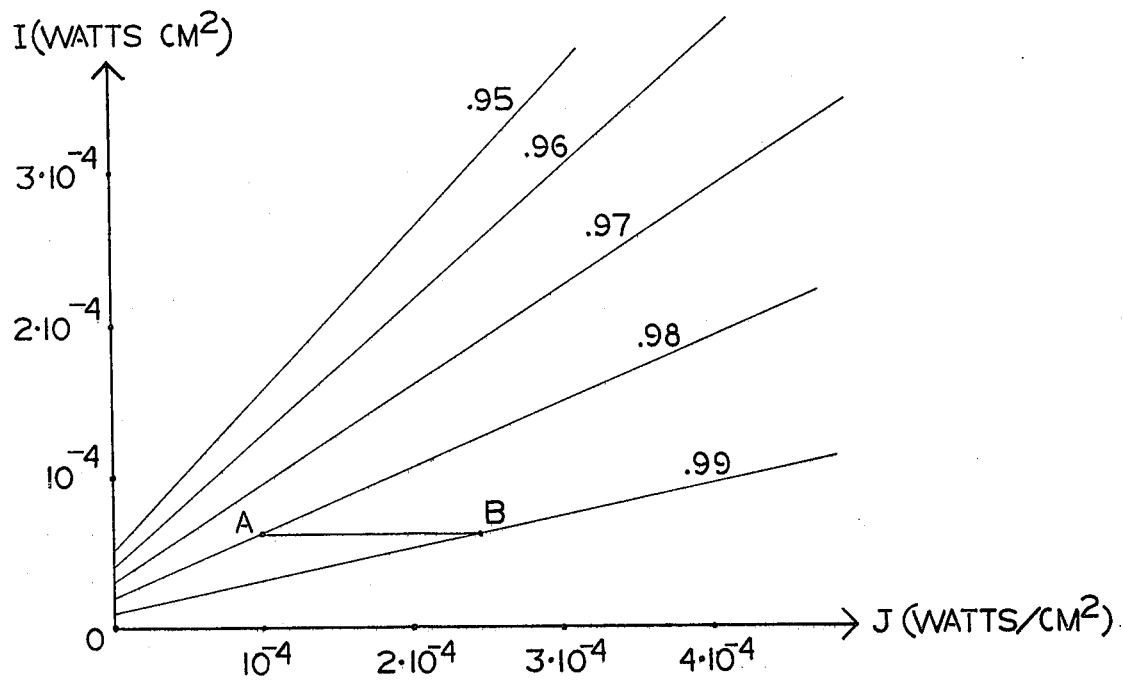
FIG. 2 shows the effect of the bleaching radiation on the density of the saturable absorber used in the specific embodiment.

Since different samples of the same photochromic material may have different bleaching constants, in practice the threshold is adjusted empirically. A source of optical energy at the laser wavelength is set to the desired threshold intensity and injected into a mode. The ultraviolet light 120 is first adjusted to high intensity so as to suppress oscillation. Its intensity is then gradually reduced until the above mode oscillates. This provides the correct setting of light source 120 for the pumping rate used in the adjusting process. This empirical process is independent of the exact dependence of the stable density on the intensities I and J as shown in FIG. 2. The adjusting process works provided only that the lines of equal stable density slope upward toward the right. The numbers shown in FIG. 2 should be considered only as an illustration and as furnishing an explanation of how the multi-mode threshold laser is adjusted.

Once a mode has been caused to oscillate by the input signal, the mode oscillation itself will bleach the saturable absorber and the mode will continue to oscillate even after the input signal is withdrawn. To turn off the modes, the pumping rate must be reduced to less than the laser oscillation threshold level.

Figure 3:
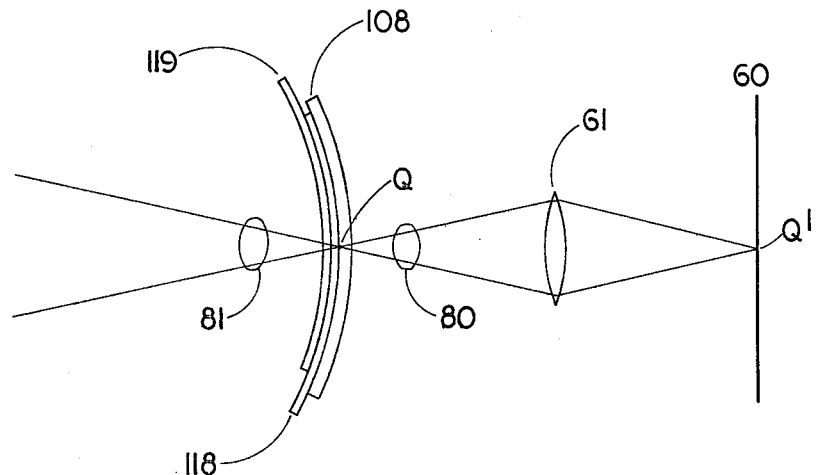
FIG. 3 shows means for focusing an optical image on the saturable absorber film of the specific embodiment.

To use the multi-mode threshold laser for contrast enhancement, the same auxiliary optical devices are used as are used to project the image from th laser cavity when it is used for image amplification. This arrangement is shown in FIG. 3. The lens 61 projects an image formed on the surface of cavity mirror 108 onto surface 60, point Q being projected to Q'. This arrangement may be applied to either end of the laser but for specificity the right-hand end is designated. For contrast enhancement, the lens 61 projects an image from surface 60 onto saturable absorber film 118. The angle of the cone 80 of the rays to an arbitrary point Q matches that of the cone 81 of the laser mode focused on Q and the axes of these two cones coincide just as in projection from the cavity. Thus radiation from a point Q' on 60 is injected into a specific laser mode, is amplified, and tends to bleach the saturable absorber in the vicinity of point Q associated with that mode. For this purpose, the surface 60 is illuminated with light of the laser wavelength 0.6328 micrometers either from the right side if the image is a transparency or from the left if the image is diffuse reflecting copy. Or a projected image may be formed on surface 60 by other optical instruments not shown. The projected rays passing through Q' must then fill out lens 61 as shown in FIG. 3.

For a given setting of the pumping rate and of the intensity of ultraviolet light 120, only modes having associated image points over a certain threshold intensity will oscillate. Radiation from oscillating modes will be emitted from both ends of the cavity but that radiation proceeding back toward plane 60 will have no effect. Radiation emanating from these modes may be projected from the other end of the cavity by an arrangement analogous to FIG. 3 but reversed left to right. The image thus projected will be a contrast enhanced version of the image on surface 60.

In adjusting the pumping rate, it is necessary to allow for the fact that the gain in non-oscillating modes will depend on the number of modes oscillating. If the number of modes that will oscillate can be predetermined, the pump rate can be set to a predetermined value which will allow just that number of modes to oscillate automatically attaining a given level of contrast enhancement. If the exact number of oscillating modes cannot be predetermined, the pump rate can be gradually increased while the output is inspected visually. When the desired level of contrast enhancement is obtained, the pump rate is fixed and the output image is recorded. Alternately, either the input image intensity or the intensity of lamp 120 may be similarly adjusted.

To use this embodiment of the multi-mode threshold laser for finding the maximum point of an optical matched filter output or for applying a threshold operation to an optical correlator output, the procedures are essentially the same as given in the detailed description of the invention except that the filter output or correlator output is formed on surface 60 as shown in FIG. 3 with He - Ne laser light and projected into the cavity as for contrast enhancement. Methods of using this embodiment of the multi-mode threshold laser as a naturally formed collection of optical logic elements are essentially those previously described but used in conjunction with an element coupling arrangement similar to that shown in FIG. 3.

The wavefronts of the modes of the multi-mode cavity shown in FIG. 1 have, as explained by Hardy, an amplitude profile equal to linear combinations of members of the family of prolate spheroidal wave functions. For the lowest order modes, the dominant prolate spheroidal wave functions approximate Gaussian functions, i.e., the amplitude of the wave shades off toward zero at the edge of the cavity. These wave profiles necessarily form in the modes because such waves have minimum diffraction losses. When injecting radiation into the cavity as shown in FIG. 3, the injected wave may be of nearly uniform amplitude over the lens 61. This will not prevent radiation from entering the mode. However, the coupling efficiency will be reduced to the extent that the input amplitude profile departs from the Gaussian profile. Essentially that part of the wavefront that forms a Gaussian profile will be accepted by the cavity; the remainder will be rejected as diffraction losses. Except for establishing the exact coupling coefficients, the Gaussian nature of the laser mode profile does not play any role in constructing the disclosed invention and will not be discussed further. Diffraction plays an essential role here only in limiting the resolution of the lens and hence the number of independent modes. The simple geometric description of the modes as shown in FIGS. 1 and 3 will thus suffice for this disclosure when taken in conjunction with a limitation on the number of available modes.

It should also be noted that the input radiation need not be coherently injected into cavity modes. Once the radiation from Q' in FIG. 3 is focused on point Q, it will directly bleach the saturable absorber of film 118 near that point and the normal cavity alignment will insure that mirror 106 will reflect the unabsorbed part of this radiation back to Q to secure further bleaching as previously described. Thus the only alignment needed to secure adequate mode injection for the disclosed invention is to cause lens 61 of FIG. 3 to focus surface 60 onto a tangent plane to the surface of mirror 108 at its axis. This alignment can be carried out using standard optical laboratory procedures.

The total number of available independent degenerate modes may be limited by the necessity of imaging the input image on the curved field of mirror 108, a difficulty that is inherent in the cavity used.

DESCRIPTION OF A SECOND EMBODIMENT

Another embodiment of the multi-mode threshold laser is based on the conjugate concentric resonator described by Pole in the book *Optical and Electro-Optical Information Processing* previously referred to. In this cavity, shown in FIG. 4, an active ruby lens 202 supplies both amplifying medium and the intercavity focusing element. The ruby is pumped by the Xenon flashlamp 204. The lens 202 images the mirror 206 on the equivalent mirror 208. These mirrors have equal radii centered at the center of lens 202 to avoid walk-off of laser modes. The ruby lens 202 focuses the "A" modes shown in FIG. 4 to mode circles $10^{-3}$ cm. diameter (equal to about 2½ times the Airy disc diameter) on the mirror surfaces. Within a field 4° in diameter centered on the optic axis, up to about $10^4$ independent modes can be obtained with this cavity.

The multi-mode action of this cavity has been described by Pole. When adequately pumped, a very large number of modes oscillate each sharing a very small portion of the pump power. The mirror surfaces are undamaged because no mode captures enough power to concentrate much radiation at any one point.

These modes are clearly spatially separated according to the definition previously given. Within the paraxial field mentioned above, they are also degenerate and hence the cavity requirements for a multi-mode threshold laser are satisfied.

Figure 4:
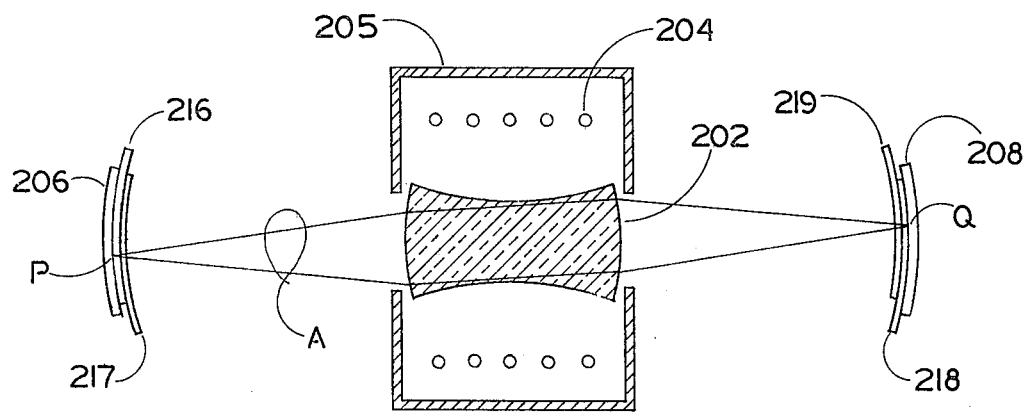
FIG. 4 shows a second embodiment of the multi-mode threshold laser.

To construct a multi-mode threshold laser, a film of saturable absorber 218 is placed on the surface of the mirror 208 as shown in FIG. 4. The dye is held in place by a cover glass 219 having anti-reflective coatings and curved with the mirror curvature. The saturable absorber is metal-free phthalocyanine dye in methanol which has a recovery time of about 1 microsecond. The thickness of the film is adjusted by pressing the cover glass against the mirror until the dye layer has an absorption of 10% for ruby laser radiation. This will occur with a layer about 0.01 cm. thick for dye concentration of about $10^{-4}$ moles/liter. According to a formula given by Ross (op. cit.), an absorbed power density of about 150 watts/cm.$^2$ is then sufficient to bleach the dye.

The pump source 204 is surrounded with a housing 205 which serves to increase pump efficiency and protect the saturable absorber from irradiation by pump light which would tend to bleach it prematurely.

Input signal radiation is injected into modes of the multi-mode threshold laser to cause the saturable absorber to bleach. A method of securing adequate mode injection is illustrated in FIG. 5 and is similar to that given previously for the specific embodiment. The input image is formed on surface 70 and focused on mirror 206 by lens 72. Since the mode circle area is about $0.8 \cdot 10^{-6}$ cm.$^2$, a total input of 0.12 milliwatts into a mode is concentrated by the lens to a power density sufficient to bleach the saturable absorber. For pump power sufficient to just allow oscillation without the saturable absorber in the cavity, the input radiation will select the oscillating modes. For lasers of power output greater than 1½ watts and with 10,000 controllable modes, an input-output gain greater than unity is obtained.

As soon as the pulse of pump light from the flash lamp 204 is incident on the ruby 202, the optical gain in the cavity is increased. (Since the input signal is also obtained from a ruby laser, the flashlamps in these two lasers must be synchronized to obtain simultaneous pulses.) As the threshold gain is exceeded one or more of the modes breaks into oscillation. Under certain conditions, each mode will oscillate in a series of relaxation pulses typically less than one microsecond apart.

If a mode oscillates at any time during the laser pulse, it is regarded as an oscillating mode for readout purposes. If the input signal to a particular mode has not caused the mode to oscillate before the pumping rate has reached its peak, then it will not oscillate in the remainder of the computing cycle. The input signal threshold is therefore determined by the peak pumping rate. The peak pumping rate is adjusted by varying the voltage on the capacitors used to excite the flashlamps.

After the flashlamp pulse has passed its peak and begins to decay, some oscillating modes will pass below input signal threshold. However, the saturable absorber in the oscillating modes will continue to be bleached by the radiation from the ruby 202 and so these modes will continue to oscillate. Even if the relaxation pulses have not died out by then, the pulse train will not be interrupted because the saturable absorber has a recovery time longer than the interval between pulses and so will hold its bleached state until the next relaxation pulse. Thus a non-vanishing period of time after the pumping rate peak is available for readout of the oscillating modes.

Methods of using this embodiment for the applications of the multimode threshold laser are similar to those previously described except that allowance must be made for the pulsed operation of the ruby. For contrast enhancement, a series of exposures each energized by one pump pulse of successively higher magnitude is produced. From these, the one corresponding to the desired level of contrast is selected. For finding a maximum point, or applying a threshold operation, the pump flashlamp electrical supply is cut off as soon as any mode, or the control mode, respectively, begins to oscillate. For this purpose, part of the output is diverted by semi-mirrors to photo detectors which operate silicon controlled rectifiers to short out the power source, or the laser gain may be reduced by an electro-optic switch in the cavity. Alternately, the pump pulse can be preset to the desired peak power on the basis of prior results or a series of pulses of increasing energy can be used.

As explained by Pole, the exact profile of the amplitude of the modes of the conjugate concentric multimode cavity are linear combinations of members of the family of prolate spheroidal wave functions. Since the Fresnel number of the cavity is much greater than 100, the resulting linear combination of functions will differ little from a plane wave within the ruby lens and the simple geometric description of the modes given in FIG. 4 is adequate for the purposes of this disclosure.

Although a large number of degenerate modes is naturally available in the conjugate concentric resonator, it may be convenient to apply mode gain equalization techniques to either extend the number of available degenerate modes by going further off axis where gains decrease or to more precisely equalize the mode gains to get a more accurately set threshold. Mode gains can be equalized by introducing attenuation into higher gain modes with a suitable adjusting film. To prepare this film, a uniformly illuminated surface 70 is imaged through the cavity by lenses 72 and 73 as shown in FIG. 5 onto a surface 71. The saturable absorber is removed from the cavity and replaced by a fixed (unsaturable) absorber of the same transmission. The surface 70 is illuminated with radiation 74 from another ruby laser. The active element 202 is pumped to just below oscillation threshold for the highest gain mode.

Designate the modes by the coordinate pair $x, y$ corresponding to the coordinates on the surface 71 at which that mode projects to a point. Let the effective transmission in mode $x, y$ be $t_e(x, y)$ in passing from 206 to 208 and back again. Since the multi-mode laser is not oscillating, $t_e(x, y)$ will be less than unity so the mode path has a positive effective absorption $$a_e(x, y) = 1 - t_e(x, y).$$

Some of the radiation passing through the cavity from surface 70 will be reflected at mirror 208 and again at 206 to pass a second time through the cavity. The intensity on surface 71 will then be approximately equal to $$J(x, y) = J_o(1 + t_e(x, y) + t_e^2(x, y) + \ldots) = J_o/(1 - t_e(x, y)) = J_o/a_e(x, y)$$

where $J_o$ is the value of the intensity it would have if the radiation traversed the cavity just one time. Small variations in $a_e(x, y)$, say from 0.001 to 0.02, will cause large variations in $J(x, y)$ so that measurement of $J(x, y)$ can accurately determine $a_e(x, y)$.

The effective absorption $a_e(x, y)$ will be a slowly changing function of $x, y$ and will not change drastically from one mode to the next because the variations are caused by different cavity geometry of the modes, uneven pumping, etc. Therefore, $a_e(x, y)$ can be satisfactorily determined by scanning surface 71 at a grid of points with an optical detector of small aperture, recording the values, and then preparing a contour map of the function.

Suppose the largest value of $a_e(x, y)$ is $a_{em}$. The addition of the correcting absorption $$a_c(x, y) = 0.5(a_{em} - a_e(x, y))$$

to the mode $x, y$ will equalize the gain in all modes, since the mode passes twice through the film. This absorption can be added to the mode by placing a film with a density $$D_c(x, y) = \log(1 - a_c(x, y))$$

in a region of spatial separation of modes with the density $D_c(x, y)$ at a focal point of mode $x, y$. The characteristic curve of the film (sometimes called the Hurter-Driffield curve or H-D curve) establishes a graphical functional relationship between the exposure of the film and the resulting density. Denote this function by H so that exposure $$E = H(D)$$

produces density D. When the film is exposed through a transparency with transmission $T_c(x, y)$ proportional to the required exposure $$E_c(x, y) = H(D_c(x, y))$$

the desired correction film is obtained by suitable choice of source intensity and exposure time.

Using the relation between $T_c$ and $D_c$, the values of $T_c(x, y)$ can be calculated at a grid of points and a contour map of $T_c(x, y)$ prepared. This transparency can be made of convenient large working size since it can be projected onto the correction film at reduced magnification. The variation in transmission can be obtained by several techniques, for example, drawing many very small opaque circles of diameter proportional to the required absorption as in a half-tone process. Or contours can be plotted for some suitable fine gradation of absorption, say 0.001, and sheets of colored plastic of absorption 0.001 can be cut to fit the contours. The piece fitting the lowest absorption is placed on the base of the transparency, the next lowest placed over that, etc., all in position to match the associated contour. When these sheets are pressed together and air voids eliminated, the stack will have the required variation in transmission. This transparency is then projected onto the correcting film. The images of the small circles, edges, etc., used in producing the transparency can be suppressed by some small amount of defocusing during this projection so as to give a smooth variation of exposure $E_c(x, y)$. The film is then developed to produce the gain adjusting film 216 with density $D_c(x, y)$. The film is held in place with cover glass 217 as shown in FIG. 4 with the density of $D_c(x, y)$ at the focal point of mode $x, y$.

Although somewhat laborious, the above process for producing 216 can be carried out in practice since it avoids adjusting each mode individually. It will be seen by those familiar with computerized picture processing that the operations of this process can be automated by a computer with the proper input-output terminals. Typically, a video scanner provides the input and a computer controlled CRT provides the output of suitably varied intensity, which when photographed, yields the adjusting film 216.

The power in the multi-mode laser must be kept low to avoid damaging the film 216. To increase the allowed power, 216 can be recorded on a grainless dye film such as diazo or on a non-absorbing vesicular film such as Kalvar.

DESCRIPTION OF A THIRD EMBODIMENT

Another example of a multi-mode threshold laser, shown in FIG. 6, is also based on the conjugate concentric resonator. In this embodiment, the active element is split into two equal parts 301 and 302 and separated a distance equal to the beam diameter at the center. Flat semi-mirror 311 transmits part of the beam to form the "A" modes as before and reflects part of the beam to exit the cavity via flat mirror 312 and lens 314 which focuses the beam to the output plane 316. Similarly, mirror 313 and lens 315 allow radiation from an input plane 317 to enter the cavity. The curved mirrors 307 and 308 are completely reflective and no radiation enters or leaves the ends of the cavity.

The active elements 301 and 302 are ruby pumped by Xenon flashlamps 303 and 304 enclosed in housings 305 and 306. The flat surfaces of active elements 301 and 302 are supplied with double quarter anti-reflective coatings 309 and 310. As a further precaution against coupling of modes symmetrical with respect to the optic axis, these surfaces should be tilted (wedged) about 4° with respect to a plane normal to the optic axis. The back surface of 311 should also be anti-reflection coated or wedged.

The saturable absorber film 318 is the same as in the second embodiment and is held by flat substrate 320 about 0.4 cm. in diameter. Substrate 320 is placed as close as practical to mirror 308. For the curvatures given, this will be within the depth of field of lens elements 301 and 302 and therefore in a region of spatial separation of the modes. The faces of 320 should also be anti-reflection coated or wedged.

Methods of using this embodiment are similar to those given for the second embodiment.

To get more controllable modes, the modes further from the axis must be used. The saturable absorber must then be applied as a curved film on mirror 308 and the gains of the modes must be equalized. It may also be desired to equalize the mode gains to secure a more accurate threshold level in the threshold operation.

A method for equalization of mode gain based on photographic film is described here. Adjustment of the gain in each half of the cavity is carried out separately.

Equalization of the left half of the cavity is illustrated in FIG. 7. The right half of the cavity is removed and replaced with lens 322 of focal length equal to that of 302 and which images the surface of 307 onto plane 324. Surface 317 is uniformly illuminated with ruby laser radiation 325 and the element 301 is pumped to its operating level. A red sensitive photographic film is placed in plane 324 and records the small variations in intensity due to differing mode gain since each point on 324 is imaged by a different mode. The development process is chosen to place the average exposure of this film on a suitable portion of its characteristic curve as specified later.

For proper gamma, this film would equalize mode gain when placed on the surface of mirror 307 but the average density is much too high and would inhibit laser oscillation except at very high pumping rates. To eliminate that part of the density corresponding to average mode gain, the film is processed in a subtractive reducer so that the lowest density for any mode is reduced to near zero. A proportional reducer can be used to reduce gamma if necessary. (A subtractive reducer is a chemical for treating photographic film which reduces density by a fixed amount. A proportional reducer reduces the density by an amount proportional to the density at any given point.)

To explain this process in more detail, the same notation is used as was used in describing the method of adjusting mode gain in the second embodiment. The exposure on the film at the surface 324 is then $$E_f(x, y) = E_o(1 - a_e(x, y))$$

where $E_o$ is a fixed exposure. Denote by $D_o$ the density resulting from $E_o$ so that on the developed film $$D_f(x, y) = D_o + G (E_f(x, y) - E_o)$$

where G is the film gamma. This linear relation is approximately valid since $a_e(x, y)$ is very small and $E_f(x, y)$ is very nearly equal to $E_0$.

When the density of the film is reduced by $D_1$, the transmission becomes $$T_f(x, y) = T_{01} + 2.3 \, G \, T_{01} \, E_0 \, a_e(x, y)$$

where a linear approximation has again been used and $T_{01}$ is the transmission resulting from the density $D_0 - D_1$. Through suitable choice of $D_1$, the transmission $$T_{01} = 1 - a_m - 0.5 \, a_{em}.$$

where $a_m$ is the minimum possible absorption in this film and $a_{em}$ is the maximum value of $a_e(x, y)$. When G and $E_0$ are chosen to make $$2.3 \, G \, T_{01} \, E_0 = 0.5$$

the correcting transmission $$T_f = 1 - a_m - 0.5 \, a_{em} + 0.5 \, a_e(x, y)$$

is obtained. By selection of the film and development process, the correct product of gamma G and exposure $E_0$ can be obtained. For example, Eastman Kodak Linagraph Shellburst film gives the correct gamma for an exposure of about 0.85 mcs. with 8 minutes in D-76 developer. When combined with the effective transmission $t_e(x, y)$ of this half of the cavity, the resulting transmission $$(T_f(x, y))^2 t_e(x, y) = 1 - 2a_m - a_{em}$$

is independent of $x$, $y$ and hence equalizes mode gain. The squaring of $T_f$ accounts for the fact that the mode radiation passes twice through the film.

A similar calculation may be applied to a multi-stage process in which lens 322 is of longer focal length and subsequent demagnification is used to print the correcting film on a fine grain photographic material or grainless diazo. A second correcting film is prepared in the same way for the right half of the cavity.

The two films are superimposed to form the corrective transparency 319, mounted on anti-reflective coated flat glass 321 and placed near the surface of mirror 307 so that a point on the film is over the point on the mirror surface on which it was imaged during exposure. Information on film characteristic curves, development processes and reducers can be obtained from commercial photographic supply companies. Although process parameters may be specified by the manufacturers, it is recommended that tests be made using exactly the same process to be used in film production, measurements be made on test films and the final process parameters be selected on the basis of these test results.

Although power in the multi-mode threshold laser need only be relatively low since it is used as a computing device, not a light source, the saturable absorber film 318 and the mode equalizing film 319 will be subject to optical damage because of the concentration of radiation on these components. Damage to the correcting film 319 can be minimized by moving it further out of the focal plane so as to reduce the irradiance on it. The correcting action will not be greatly disturbed since the mode gain varies only slowly across the field and not sharply from mode to mode. The saturable absorber film 318 may be considered a disposable item (as a vacuum tube in electronic devices) and replaced frequently. This replacement may be facilitated by emplacing a much larger area of saturable absorber than used in the field of view and then sliding 320 and 318 normal to the optic axis so that a new area of saturable absorber enters the field. Mechanical devices which perform this action include microscope slide manipulators, roll film handling holders and microfiche holders. The mode equalizing filter 319 may also be automatically replaced by a similar mechanism. For example, the correction transparency may be replicated on an 8 mm. motion picture film and drawn through the position designated 319 in FIG. 6 by standard motion picture projection mechanisms as often as necessary to replace damaged film. Matching of refractive indices to the glass may be obtained by a liquid gate.

DESCRIPTION OF A FOURTH EMBODIMENT

A different approach to the multi-mode threshold laser based on flat mirrors in the cavity which will give a much higher output power when selecting the mode with maximum injected intensity will now be described.

This embodiment is based on a cubic cavity having a large number of degenerate modes. The cubic cavity was known and discussed by Schawlow and Townes (op. cit.) as the first potential laser cavity. They pointed out that the cube had modes which consisted of plane waves at various orientations. Although the rigorous theory of these modes requires that they be considered as standing waves, an intuitive understanding of their nature can best be obtained by considering them as traveling waves reflected back on themselves just as an incident plane wave is returned to its source by a corner cube reflector (also called a retro-reflector).

The first lasers were constructed with the purpose of obtaining the most intense possible source of completely coherent light. For this purpose, it is desirable to suppress all but one mode of the cavity since different modes generally oscillate independently of each other so that their radiation is not mutually coherent. With this in mind, Schawlow and Townes selected the most geometrically distinguished mode type in the cube: the plane wave parallel to two opposite faces reflected by these faces as it bounces back and forth between them. By trimming away all but a cylinder stretching from one face to the opposite, to allow access for pump light, Schawlow and Townes delineated the flat plate optical resonator.

For the purposes of the disclosed invention, it is desirable to have a large number of modes which are not distinguished from each other in terms of losses (degenerate modes). Such a collection of modes is found in the cubic cavity as the plane waves traveling approximately parallel to a diagonal of the cube and which are reflected back and forth by the corners acting as retro-reflectors. When such waves exit the cube, they are refracted and bent so that a different plane wave emerges from each face. The exit port must therefore be entirely in one face of the cube so the optic axis cannot be the cube diagonal but must be displaced slightly to intersect a face rather than a vertex. Clearly, the optic axis of a resonant cavity, when considered as a ray path, must close on itself.

Figure 8:
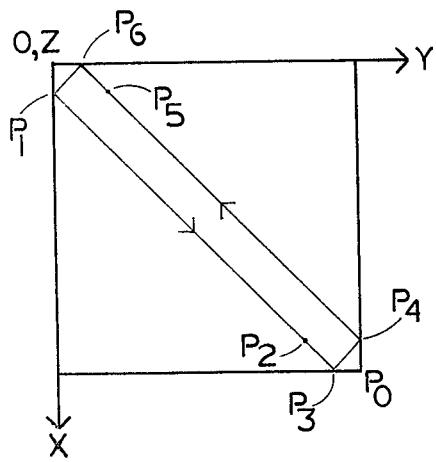
FIGS. 8, 9, 10 and 11 show the geometry of the cavity used in the fourth embodiment.
Figure 11:
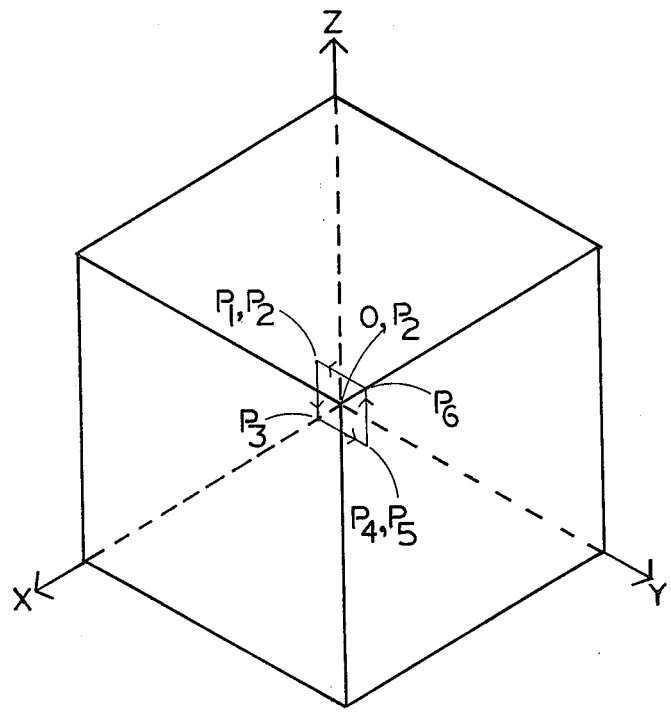
Figure 9:
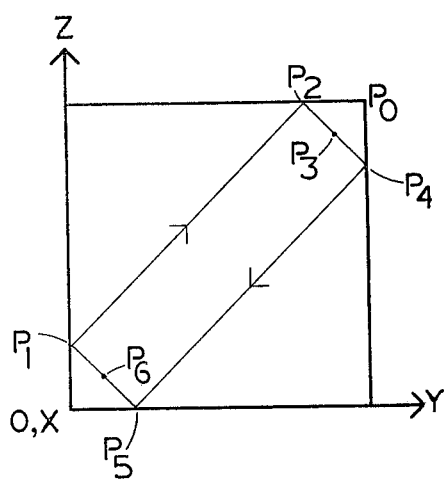
Figure 10:
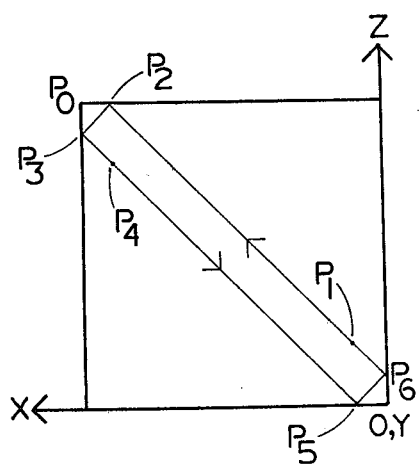

The optic axis of the mode bundle used in this embodiment is shown in FIGS. 8, 9 and 10 which respectively show the top, front and side views of the cube. The axis, considered as a ray, returns to itself after six reflections on the faces of the cube. These reflection points are denoted $P_1$, $P_2$, $P_3$, $P_4$, $P_5$ and $P_6$ in order in which they occur in a cycle around the ray path. FIG. 11 shows a view along the diagonal $OP_o$ of the cube.

The cube edge is 10 cm. in length. Point $P_1$ has coordinates $x = 1$ cm., $y = 0$ cm. and $z = 2$ cm. The axes $P_1P_2$ and $P_4P_5$ are parallel to the diagonal of the cube $OP_o$. In conjunction with the laws of reflection, this determines the geometry of the optic axis of the cavity.

Figure 12:
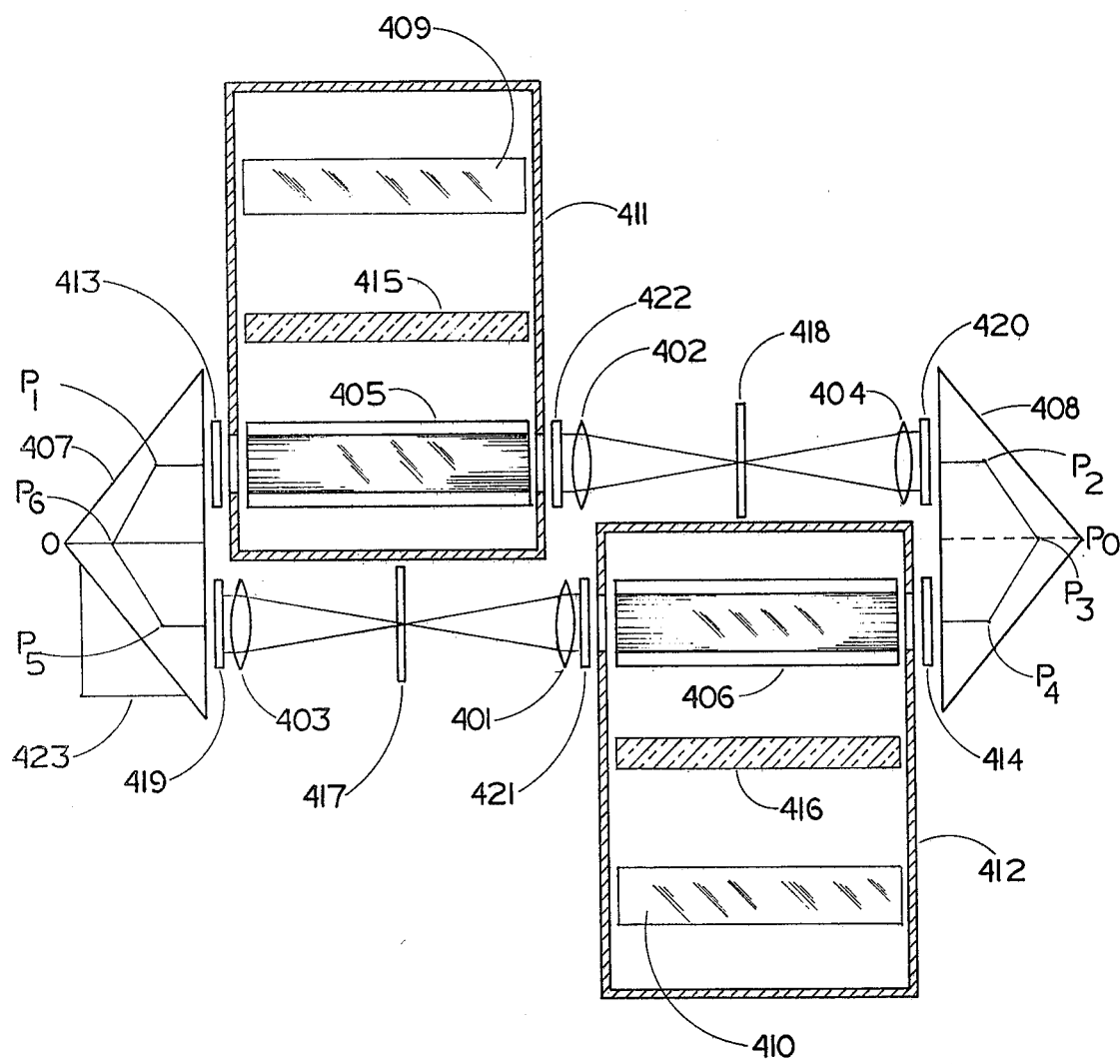
FIG. 12 shows a fourth embodiment of the multi-mode threshold laser.

FIG. 12, a projection on the plane of the axes $P_1P_2$ and $P_4P_5$, shows the multi-mode cavity after the unused parts of the cube are trimmed away. The points 0, $P_o$, $P_1$, $P_2$, $P_3$, $P_4$, $P_5$ and $P_6$ are in the same geometric relation as in FIGS. 8, 9, 10 and 11. The only remaining solid parts are the corners 407 and 408 with interior faces normal to the axes $P_1P_2$ and $P_4P_5$.

In order to provide for the spatial separation of the modes, two pairs of lenses are included in the optic axis, one pair in path $P_1P_2$ and the second pair in path $P_4P_5$. Each lens is identical and each pair is separated by twice their common focal length. These lenses should be anastigmatic to have the flattest possible fields at the laser wavelength.

The four lenses used to get spatial separation are denoted 401, 402, 403 and 404. Their focal length is 3.3 cm. giving a mode circle diameter 0.0014 cm., about 2½ times the Airy disc diameter. This multi-mode ring cavity differs from the cavities previously described in that waves traveling in opposite directions around the ring may exist independently of each other, i.e., it has traveling wave modes.

To make this cavity into a laser, amplifying elements 405 and 406 are added as shown in FIG. 12. These are clad 90° cut ruby rods, 5 cm. long, 1 cm. in diameter and doped to 0.035% chromium ion. The orientation of the c-axis is chosen so that the plane of polarization of greatest gain is inclined about 120° counter clockwise from horizontal right when looking from $P_4$ to $P_5$ and from $P_2$ to $P_1$. The cladding is sapphire of diameter 1.5 cm. to promote even pumping of the ruby. At the end of the rod nearest the cube corners, an aperture of about 0.9 cm. diameter is installed so off axis modes are entirely within the ruby rods.

When lenses 401, 402, 403 and 404 are separated by twice their focal length (in terms of optical distance), each common focal plane is imaged on itself with unit lateral and angular magnification. This reduces mode "walk-off" (losses due to apertures in the cavity) and tends to equalize the gains of off axis modes. When the indices of refraction of the ruby rods and corner reflectors are taken into account, the lens spacing shown in FIG. 12 is derived.

The ruby rods 405 and 406 are pumped by Xenon flashlamps 409 and 410 housed in elliptical cylinder reflectors 411 and 412 with lamp and ruby at the foci. The pumping system includes heat-absorbing glass filters 415 and 416 which absorb all wavelengths longer than about 0.7 micrometers and pass shorter wavelengths. These filters help to keep the rubies cool without greatly reducing pumping efficiency since the ruby is pumped in bands of wavelengths shorter than 0.7 micrometers.

The corners of the cube 407, 408 are made of optical glass. Since the optic axis makes an angle of about 55° to the normal to the cube face, plane waves traveling approximately parallel to the optic axis will be totally reflected at $P_1$, $P_2$, $P_3$, $P_4$, $P_5$ and $P_6$. Included in the cavity are optical rotator and polarizer assemblies 413 and 414 consisting of a linear polarizer and two retardation plates (sometimes called compensation plates). The polarizers are adjusted to coincide with the direction of polarization of the radiation incident on the ruby rods which is amplified most by the ruby. When linear polarized light is totally reflected, it is converted to elliptically polarized light. This elliptically polarized light is converted to linearly polarized light by one retardation plate and this is rotated to the favorable plane of polarization by the other retardation plate.

Retardation plates are made from anistropic crystalline material in which the index of refraction is different for two orthogonal planes of polarization, thus yielding a relative phase retardation for these two polarization states on transmission through the material. Since elliptically polarized light is light for which two orthogonally polarized components are 90° out of phase with each other (coordinates are chosen along the axes of the ellipse), and since for plane polarized light such components are in phase, it follows that elliptically polarized light can be converted to plane polarized light by passage through a suitably oriented retardation plate producing a phase difference of 90° (a quarter wave plate).

To determine the correct orientation, polarized light at the ruby wavelength is directed to enter the cavity parallel to the optic axis $P_4P_5$ at the entrance of ruby 406 and directed toward $P_5$. This beam is oriented for maximum amplification in rod 406. The state of polarization of light at the entrance of the rod 405 is then determined using standard optical techniques. The quarter wave plate is then oriented so that its fast axis is parallel to the short axis of the ellipse describing the polarization at that point.

A retardation plate which induces a phase difference of 180° (half wave plate) can rotate the plane of polarization of linearly polarized light by an arbitrary amount. The slow axis is oriented so as to bisect the angle between the plane of polarization and the incident and transmitted light. A half wave plate is combined with the quarter wave plate previously placed so as to rotate the plane of polarization to that most amplified by the ruby. The two compensation plates are combined to form assembly 413. Assembly 414 is designed and constructed in an analogous manner. The polarization state of radiation traveling in the other direction around the ring is also corrected by assemblies 413 and 414 since the total phase shifts in two orthogonal components are independent of the order in which the shifts take place.

Retardation plates may be purchased from commercial optical supply houses. Information about techniques for determining the state of polarization of light may be obtained in texts on optics, applied optics and optical engineering.

Decoupling from the cavity is obtained by placing a glass prism over the face of the cube containing $P_5$. The distance between the prism face and the cube face is adjusted to frustrate the internal reflection sufficiently to give a transmission of 0.5 for a ray parallel to the optic axis.

Total internal reflection at an air glass interface is frustrated by bringing a second glass surface to within a few wavelengths of the internally reflecting surface. Some of the energy then "leaks" across the air gap into the second glass and is not reflected. The amount of the transmission depends on the separation of the two glass surfaces and is unity for zero separation and is essentially zero for separations larger than several wavelengths as in normal total internal reflection. To adjust the transmission to the desired value, the surface of the prism is brought closer to the surface of the corner reflector 407 (keeping them parallel) until the desired 50% transmission is obtained for ruby wavelength at the angle of incidence corresponding to the optic axis and cavity polarization. The spacing can be closely adjusted by securing a very thin raised edge on the edge of the prism (or several raised points) and then chemically milling this edge with a very dilute solvent. After each very short exposure to the solvent, parallelism and transmission are checked. If the transmission is too low, more solvent is applied to further lower the edge. Or the raised edge may be systematically reduced by very fine grinding or polishing. Additional information on frustrated total internal reflection may be obtained from an article by L. Bergstein, et al, in *Proc. I.R.E.*, Vol. 50, No. 8, p. 1833, Aug. 1962. The decoupling prism is shown symbolically as item 423 in FIG. 12.

The laser thus described constitutes a multi-mode laser. The modes are plane waves in the ruby rods 405 and 406 which are focused to points in the common focal planes of lenses 401 and 403 and lenses 402 and 404 and reprojected as plane waves by these lenses. The Fresnel number of this cavity is quite large so diffraction losses are negligible. The geometric optics description of the modes is entirely adequate. However, modes which are symmetric with respect to the optic axis are coupled by reflection at the flat faces of rods, filters, etc. Since the modes must be independent, only modes on one side of the cavity are used. To suppress the modes in the other half, an opaque foil 418 is placed in the common focal plane of 402 and 404 with one straight edge on the optic axis.

The gains of the modes traveling at small angles to the optic axis are nearly equal because the geometry of each mode is nearly equal to every other, i.e. the modes are degenerate. The common focal plane of 401 and 403 constitutes a region of spatial separation and the common focal plane of 402 and 404 is another. The multi-mode laser shown in FIG. 12 is thus suitable for constructing a multi-mode threshold laser.

The saturable absorber film 417 is introduced in the common focal plane of lenses 401 and 403. The saturable absorber in this embodiment is unpumped ruby as described by W. Kosonocky in U.S. Pat. No. 3,270,291. For use in a multi-mode laser, the ruby is to be in the form of a thin slab 0.01 cm. thick so as to occupy only the region of spatial separation. The volume of saturable absorber in a given mode is then about $1.5 \cdot 10^{-8}$ cc. The ruby is doped to about 0.75% $Cr_2O_3$ to yield about $3 \cdot 10^{20}$ chromium ions per cc. The absorption of the film should be about 5%. The energy necessary to bleach the saturable absorber can be calculated in exactly the same manner as pump energy needed for oscillation in ruby lasers since bleached saturable absorber is just ruby pumped to unit optical gain. Since about 4 joules per cc. is needed for normally doped ruby (0.05%), this high doping requires about 60 joules per cc. or about 0.9 microjoules in each mode volume. This energy needs to be delivered within the computing cycle which may be about one millisecond so a minimum power of only about 0.9 milliwatt is needed to release a mode. No allowance need be made for incomplete absorption if the input energy is injected into a mode.

Normally, doped ruby has been found to suffer no damage up to radiation densities of $10^8$ watts/cm.$^2$. For the higher doping used in the saturable absorber, this limit should be reduced to $6 \cdot 10^6$ watts/cm.$^2$. Since the mode circle is $1.5 \cdot 10^{-6}$ cm.$^2$ area, a total output power of about 4.5 watts per mode can be delivered without saturable absorber damage, allowing for a decoupling factor of one-half.

In this embodiment of the multi-mode threshold laser, pump light tends to bleach the saturable absorber independently of the input signal. Although such an effect can be used to increase sensitivity, better design is obtained by using controlled saturable absorber illumination and blocking stray pump light. The housings 411 and 412 block most pump light. Undesirable leakage through the ruby rods is prevented by filters 419, 420, 421 and 422. These are high pass interference filters with a cut-off wavelength just a little shorter than the ruby wavelength and having maximum transmission of about 95% at the laser line. Although pump light normally incident on such filters may pass through, such radiation will not fall on the saturable absorber. Since radiation of longer wavelength is blocked by heat-absorbing glass filters 415 and 416, incidence of pump light on the saturable absorber is substantially eliminated.

All optical parts, especially the ruby rods, should be of the highest optical quality. All optical surfaces designated flat or indicated to be flat are optically flat to within 1/50 wavelength. All flat surfaces are provided with double quarter antireflection coatings optimized at the ruby laser wavelength. All filters are to be normal to the optic axis which passes through them. All cavity parameters not discussed, all fine adjustments and all final adjustments are adjusted to promote equal mode gain in all modes within about 4° of the optic axis.

Absorption losses in the glass components total about 25% but these losses are dominated by the decoupling loss which extracts 50% of the cavity energy on each cavity round trip. The ruby rods have sufficient gain to make up for these losses when pumped with about 18 joules each. Each rod then has a gain of about 1.6 so the total amplification is about 2½. Of course, the flash lamps will have to deliver much more energy depending on pumping system efficiency.

The energy stored in the pumped ruby not extracted by lasing action is emitted by the ruby as fluorescence at the ruby wavelength. This radiation will necessarily fall on the saturable absorber and tend to bleach it thus reducing the amount of input needed for bleaching. Since 18 joules are needed to achieve oscillation threshold, about 6 joules will be incoherently emitted in a millisecond long computing cycle and cause about 0.5 microjoules to fall on each mode circle of the saturable absorber. The spontaneous emission will not cause enough bleaching to itself release modes when the ruby rods 405 and 406 are pumped to the oscillation threshold without the saturable absorber in the cavity. However, this fluorescence will decrease the input signal threshold to about 0.4 microjoules at that pumping level.

The above calculation does account for amplification of the fluorescence by the ruby. The ½ microjoule incident on the mode circle is not initially absorbed because its absorption is only about 5%. The remaining 95% traverses the ring, is reduced by losses and restored to the 95% value by the amplification, for a second pass. This is repeated until the entire ½ microjoule is absorbed.

The above calculation does not account for increased amplification due to partial bleaching, saturable absorber emission, or exact length of the computing cycle, all of which will depend on input signal pulse shape, flashlamp pulse shape, flashlamp radiance distribution, and other factors. In a particular set-up, empirical compensation by adjustment of saturable absorber density and flashlamp pulse size is necessary to obtain desired performance characteristics.

If the fluorescence is not sufficient to reduce the threshold to the desired value, absorber density is decreased, pump power is increased or a second source of ruby laser radiation can be used to illuminate the saturable absorber. If the laser construction allows too much fluorescent light to fall on the saturable absorber, its initial optical density may be increased to prevent the modes from releasing prematurely. An input signal threshold of any desired value can be achieved because input signal radiation will always select the oscillating mode when added to a uniform fluorescence, but reliability may be reduced if input signal energy is much less than fluorescent energy.

Figure 13:
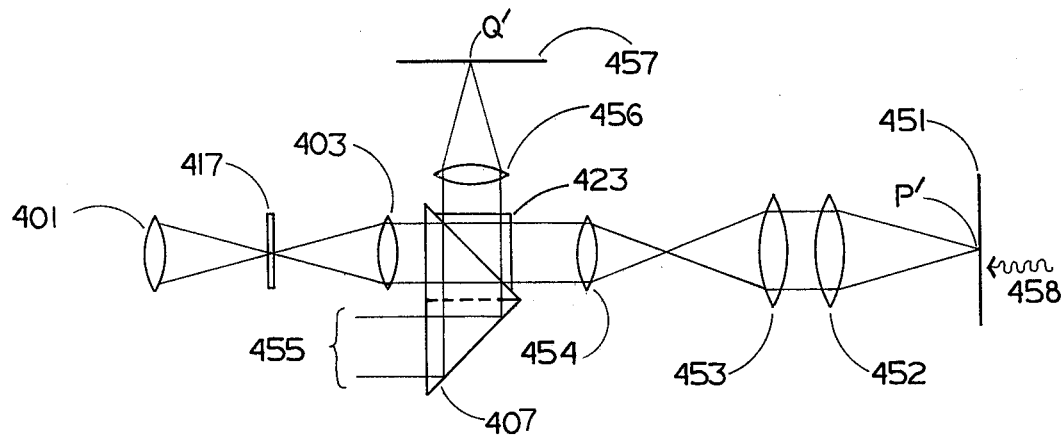
FIG. 13 shows a means for injecting optical input signals into the modes of the fourth embodiment.

In operating this embodiment of the multi-mode threshold laser, input optical beams are injected into the cavity as shown schematically in FIG. 13. Lenses 452, 453 and 454 are arranged to project the input image in plane 451 into the cavity through prism 423 so as to focus plane 451 onto film 417 through lens 403 with such magnification that the entire input field occupies an area not more than 1.5 mm. square on one side of the axis opposite to the image of the opaque metal foil 418 as projected on 417. Note the axis of the lens system 452, 453 and 454 is not parallel to the axis of the cavity but is a continuation of the cavity axis as refracted by prism 423 and corner reflector 407. The mode 455 stimulated into oscillation is emitted through prism 423 and projected by lens 456 to plane 457 where it is observed or recorded. The ruby laser supplying radiation 458 should be synchronized with the flashlamps 409 and 410 so that the input signal falls on the saturable absorber just as the ruby rods 405 and 406 are pumped to their operating level. If the input comes too soon, it will not be properly amplified and if it comes too late, a tendency to form giant pulses will develop in the multimode laser. If the radiation 458 is not of the state of polarization such that after entering the cavity as shown its polarization is linear of correct orientation to be maximally amplified by the ruby, then the coupling coefficient will be reduced. It may be desirable to include polarization correction assemblies such as 413 and 414 in the optical injection train between 454 and 423 to optimize the input radiation polarization state.

This embodiment of the multi-mode threshold laser is intended to be used to find the point of maximum intensity in the input image. Only that one mode corresponding to the maximum point is to oscillate. In the previous embodiments, oscillations could be limited to a single mode only by severely limiting pumping rate and thus also reducing output power. In this embodiment, only one mode will oscillate even at very large pump rates and this one oscillating mode will be that with the greatest injected input energy.

It has been shown by G. Wagner and G. Birnbaum that in a ruby laser cavity without standing waves, the mode with the highest gain will oscillate first and it will interact nonlinearly with the active medium to reduce the over-all cavity gain in the other modes to less than unity and thus prevent the other modes from oscillating. See, for example, Chap. IV of the book *Optical Masers* by G. Birnbaum, published by Academic Press, N.Y., 1964. In the multi-mode threshold laser, the mode with the highest gain will be that with the most bleaching in its saturable absorber mode circle, i.e., the mode with the highest injected input signal energy. This theory of single mode operation does not apply to gas lasers or cavities with standing wave modes such as the first three embodiments.

As previously described, each mode, as the term is used in this disclosure, consists of a grouping of axial modes all focused on the same mode circle of the saturable absorber. When that saturable absorber is bleached, some of these cavity modes oscillate. In this embodiment, the cavity modes are distinguished in direction of travel around the ring $P_1$ to $P_6$ as well as in exact frequency. It is immaterial which exact frequency is excited, but it is desirable that the direction of travel be in the same sense as the injected optical signal so the output can be emitted from the other face of prism 423 as shown in FIG. 13.

This sense of direction will be preserved since some of the input radiation will be injected into each cavity mode of the same direction. Laser oscillations are actually initiated as an amplification of radiation in the modes. Usually this initial mode radiation is random spontaneous emission from the active material but the injected radiation will dominate, even though only a small fraction enters the cavity mode. Note that no radiation is injected into any cavity mode with a reverse direction so there is no question of equalizing coupling coefficients. Thus the direction of travel can be practically controlled by coherent injection into a cavity mode even though a uniform threshold capability by coherent injection has not been reduced to practice.

Once an oscillation starts in the proper direction, it will suppress oscillation in the opposite direction as well as all other modes. The pump energy can thus be increased to provide a much greater single mode output power than in standing wave cavities. The increase in single mode output power for traveling wave cavities with homogenous broadening (ruby lasers) has been documented by C. Tang, H. Statz, G. de Mars and D. Wilson, Physical Review, Vol. 136, p. Al. Oct. 1964.

DESCRIPTION OF THE PREFERRED EMBODIMENT

Figure 14:
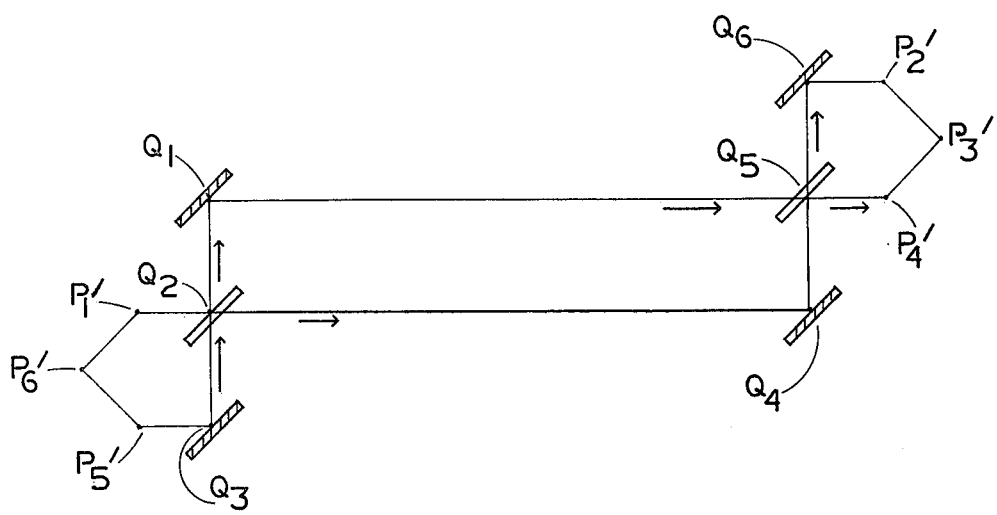
FIG. 14 shows a method for introducing standing waves into an optical cavity formed by retro-reflectors.

In the previous embodiment, the saturable absorber could be placed on a flat film not located adjacent to a metallic reflecting surface but only one mode could give an output signal. The same absorber configuration can be obtained with multiple output when the cavity is modified to possess standing wave modes. To this end, the ring cavity of the fourth embodiment is folded at $Q_1$, $Q_3$, $Q_4$ and $Q_6$ (see FIG. 14) to cause the ring to intersect itself at $Q_2$ and $Q_5$. Here semi-mirrors are placed that divert some radiation in the ring to the reverse direction as shown by the arrows. This couples oppositely directed modes of the same orientation.

Figure 15:
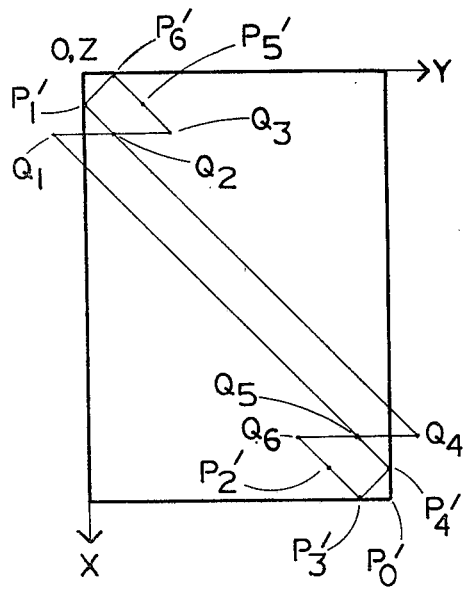
FIGS. 15, 16, 17 and 18 show the geometry of the cavity used in the preferred embodiment.
Figure 18:
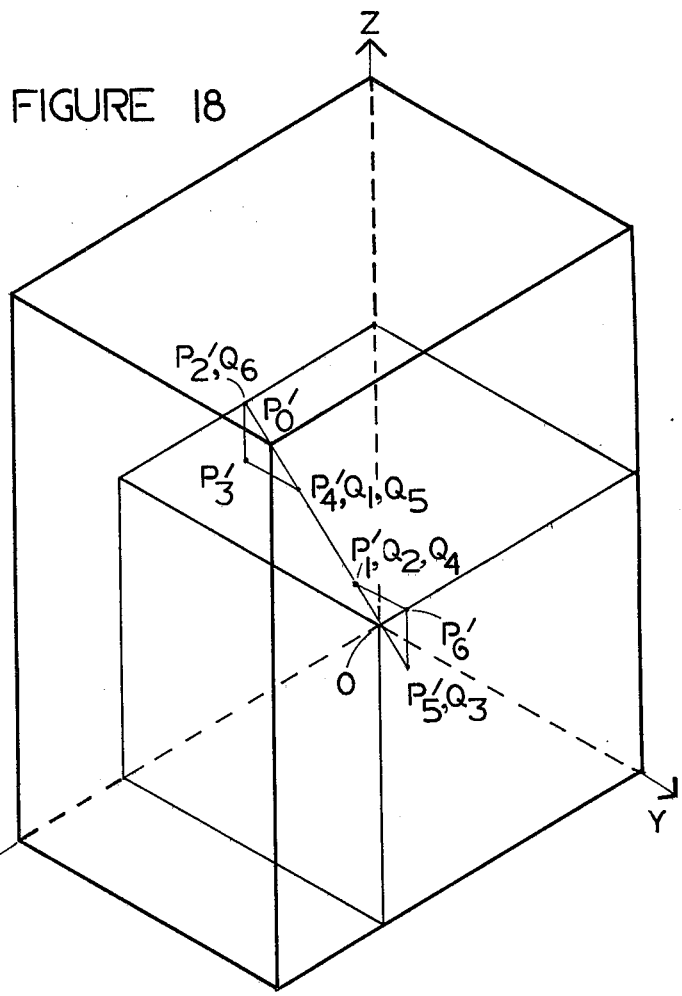
Figure 16:
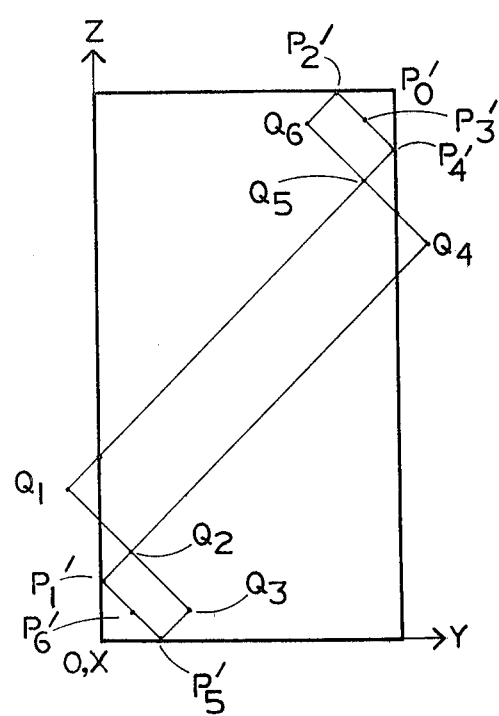
Figure 17:
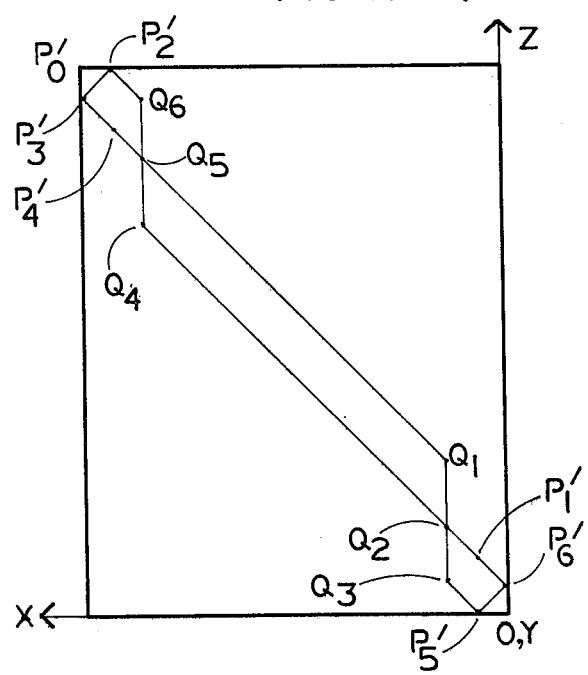

The resulting ray path may be conveniently emplaced in the rectangular parallelepiped shown in FIGS. 15, 16 and 17 in its top front and side views respectively. Its dimensions are 10 cm. width, 14 cm. depth and 18 cm. height. Point $P_1'$ has coordinates $x = 1$ cm., $y = 0$, $z = 2$ cm. and point $P_4'$ has a symmetric location. Line $Q_1Q_3$ is parallel to the y-z plane, $Q_2$ has an $x$ coordinate of 2 cm., and line $Q_4Q_6$ and point $Q_5$ are located symmetrically. The axes $P_1'Q_4$ and $P_4'Q_1$ are parallel to the diagonal of a cube with edges along the coordinate axes. Together with the laws of reflection, this determines the geometry of a closed ray path. FIG. 18 shows a view parallel to the diagonal and also shows the cube previously mentioned with an edge 10 cm. in length.

In FIGS. 14 to 18, primed symbols denote points playing a role analogous to the same unprimed symbol of FIGS. 8 to 11. The ray shown in these FIGS. is taken to be the optic axis. Plane waves traveling at small angles to this axis are resonant and form modes of a multi-mode cavity. The waves may be considered equivalent to the modes of the rectangular parallelepiped as described by Schawlow and Townes (op. cit.) except that paths $Q_1Q_3$ and $Q_4Q_5$ provide "short cuts". These modes are thus topologically equivalent to the cubic cavity modes.

Figure 19:
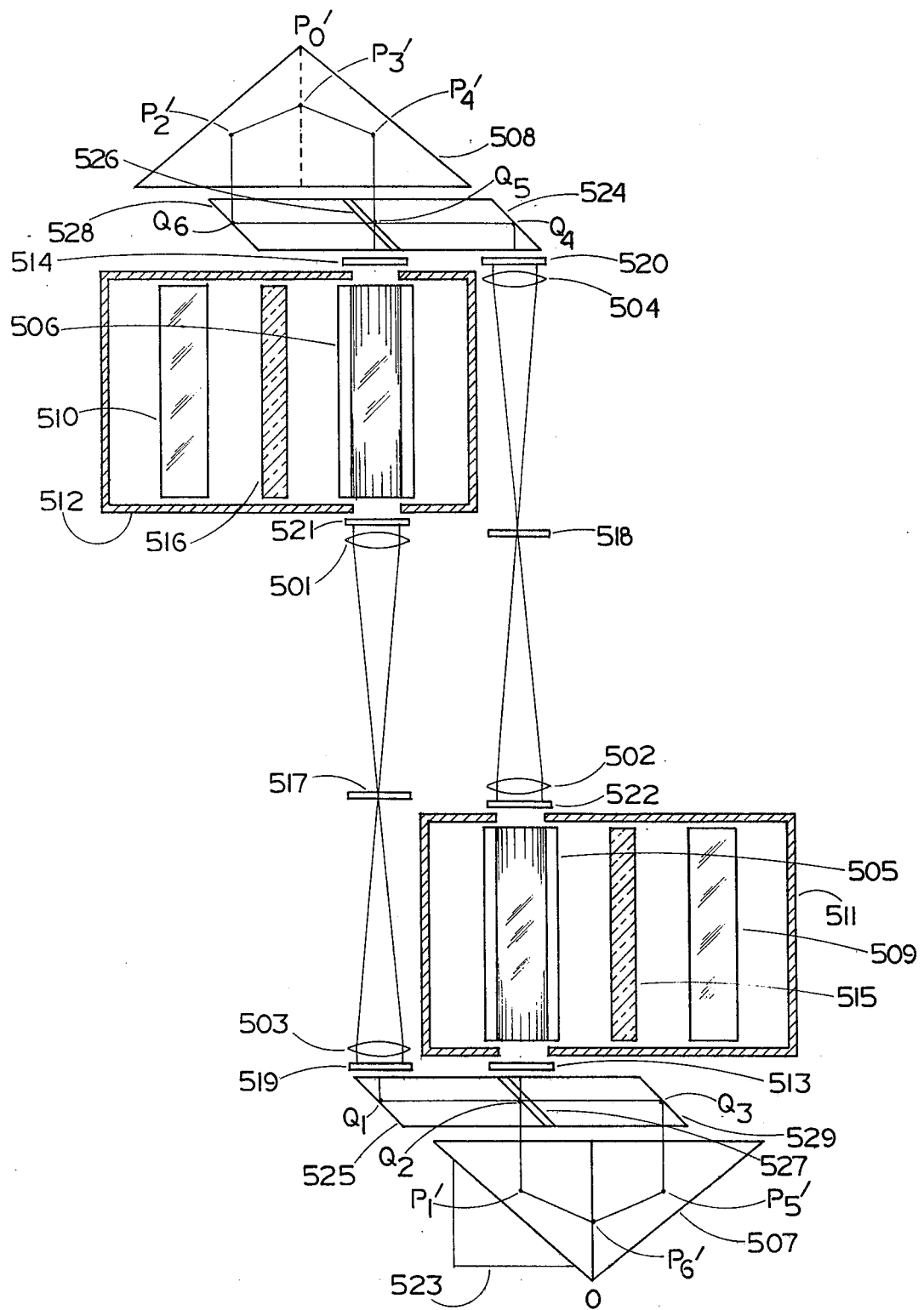
FIG. 19 shows the preferred embodiment of the multi-mode threshold laser.

When the unused portions of the rectangular parallelepiped are cut away, the configuration of FIG. 19 is obtained, as projected on the plane of the axes $P_1'Q_4$ and $P_4'Q_1$. The only remaining solid parts are the corners 507 and 508 with faces normal to the optical axis. The points $0$, $P_0'$, $P_1'$, $P_2'$, $P_3'$, $P_4'$, $P_5'$, $P_6'$, $Q_1$, $Q_2$, $Q_3$, $Q_4$, $Q_5$ and $Q_6$ are in the same relative geometric position as shown in FIGS. 15 to 18.

The parts of the laser shown in FIG. 19 are designated with numerals 100 greater than the analogous parts of the fourth embodiment and are generally constructed in the same fashion unless otherwise specified. New components are prisms 524, 525, 528 and 529 which provide reflections at $Q_4$, $Q_1$, $Q_6$ and $Q_3$ respectively by total reflection. These rhomboidal prisms displace a plane wave beam without changing its orientation. Between them are air gaps 526 and 527 which provide beam splitting at $Q_2$ and $Q_5$ by means of frustrated total internal reflection. The splitting ratio is about ½.

Anistigmatic lenses 501, 502, 503 and 504 focus plane wave modes on two common focal planes securing regions of spatial separation. These lenses are of equal focal length of 5.5 cm. They are spaced two focal lengths apart on the optic axis. When the indices of refraction of the ruby, prisms and corner reflectors are taken into account, the spacing is found to be approximately as shown in FIG. 19.

The cavity is converted to a laser by inserting clad 90° cut ruby rods 505 and 506 each 5 cm. long and 1 cm. diameter. These are pumped by flashlamps 509 and 510 housed in elliptic cylinders 511 and 512 with rod and lamp at the foci. Heat absorbing glass filters 515 and 516 reduce ruby heating. Retardation plate assemblies 513 and 514 convert elliptically polarized radiation to the linear polarization of the correct orientation for maximum amplification by the ruby rods. The cladding is sapphire of 1.5 cm. diameter.

The modes are degenerate and spatially separated for reasons previously cited. The mode circles are about 0.002 cm. diameter. A multi-mode threshold laser is therefore created by inserting saturable absorber film 517 at the common focal plane of lenses 501 and 503. High pass filters 519, 520, 521 and 522 with maximum transmission at the ruby wavelength cut off lower frequency radiation and isolate the saturable absorber from the pump light. Radiation enters and leaves the cavity through a glass prism (shown symbolically in FIG. 19 as item 523) by means of frustrated internal reflection at the face containing $P_1'$. To avoid internal coupling of modes by reflection at flat surfaces, an opaque metal foil 518 is placed in the common focal plane of 502 and 504 with edge on the optic axis suppressing half the modes.

The saturable absorber is the same as for the second embodiment. The dye concentration is adjusted to give the 0.01 cm. thick film an absorption of 4%. Bleaching will then be attained by an absorbed power density of 60 watts/$cm^2$. corresponding to an injected power of about $2 \cdot 10^{-4}$ watts per mode. Since absorbed fluorescent power is about 40 watts/$cm.^2$, the spontaneous emission will not cause bleaching but will cut the input signal threshold to about one-third the above value (less than 0.1 milliwatt per mode) at the pumping rate giving unity gain without the saturable absorber in the cavity.

Optical signals are injected into this embodiment in a manner analogous to that shown in FIG. 13 except that input radiation passes through the rhomboidal prisms also. The preferred embodiment will not have a tendency to single mode operation and the oscillation of the first mode will not suppress the oscillations of other modes when pumping rate increases substantially above threshold. The linear theory of Wagner and Birnbaum does not apply to this cavity since modes traveling in each direction aroung the ring are coherently coupled to modes traveling in the other direction by reflections at $Q_2$ and $Q_5$ of FIG. 14. These reflected beams traveling in opposite directions set up standing wave interference patterns in the ruby rods which prevent the first oscillating mode from extracting all the available energy from the active elements. Thus other modes will oscillate as the gain is increased. The theory of this effect has been explained in detail by C. Tang, H. Statz and G. de Mars, Journal of Applied Physics, Vol. 34, No. 8, p. 2289, August 1963. The methods of using the preferred embodiment are therefore similar to the methods of using the second embodiment.

The mode activation pattern during the pumping pulse is somewhat more complex in this embodiment. In the second embodiment, a great number (typically thousands) of modes oscillate. The description of the pattern of oscillation is essentially statistical and the phenomena was described by Pole in the references cited in the description of the second embodiment. In the fourth embodiment, only one mode will oscillate. The preferred embodiment is an intermediate case in which hundreds of modes may oscillate, but not enough to justify a statistical description of their oscillation pattern.

The sequence of mode oscillation is essentially described by the theory of Tang, Statz and de Mars (1963, op. cit.) with modifications appropriate to the presence of the saturable absorber. Since the saturable absorber is adjusted to only a few percent absorption, some mode will surely oscillate shortly after the pumping rate exceeds the oscillation threshold of the laser without the saturable absorber. The selection of which mode oscillates is governed by the bleaching due to the optical input signal. When this mode oscillates, energy is extracted from the active material producing relaxation pulses slightly larger than normal. The gain in the other modes decreases and the pump energy subsequently received goes into the oscillating mode. As the pumping rate increases, the gain in the non-oscillating modes increases because of standing wave formation and eventually one of these modes begins to oscillate. The selection of which mode oscillates is again determined by saturable absorber bleaching since the standing waves allow pump energy equally into all other modes. The standing waves affect gain unequally in only one mode because they form a three-dimensional planar sinusoidal variation in intensity (and inversion) proportional to a three-dimensional Fourier component and different Fourier components are orthogonal. When the second mode oscillates, gain is reduced in other modes and builds up as pumping rate increases. This activation pattern repeats itself until the mode with input intensity equal to the input signal threshold intensity oscillates at which time the computing cycle is complete. Variations in threshold caused by fluorescence or variations in mode gain caused by extraction of energy by already oscillating modes do not affect the order in which modes begin to oscillate.

Figure 20:
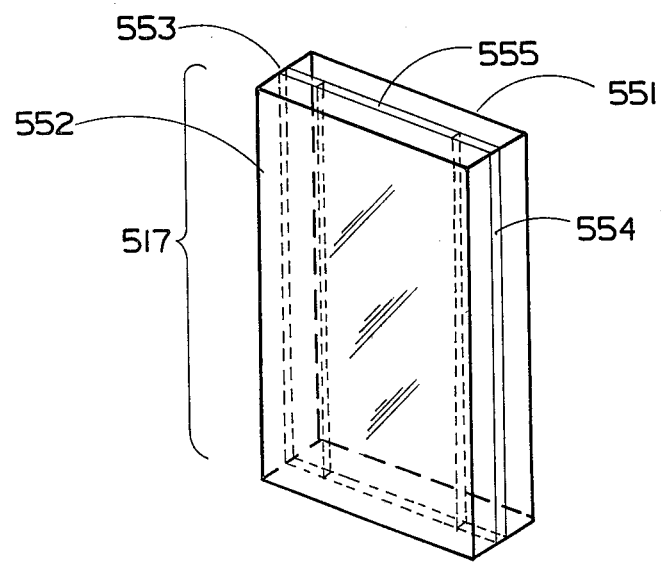
FIG. 20 shows a cell for holding a saturable absorber dye such that the dye may be continuously replaced.

The preferred method for replacing the dye is shown in FIG. 20. The two optically flat glass covers 551 and 552 sandwich the dye solution 555 between them at separation 0.01 cm. determined by the two lateral spacers 553 and 554. The assembly as shown constitutes 517 in FIG. 19. Rubber tubes, not shown, are slipped over the top and bottom. The upper tube is connected to a pressurized dye reservoir which feeds fresh dye into the cell on a continuous basis. The dye exits through the lower tube. For moderate pressures, the dye will be essentially stationary during a laser pulse but will flow sufficiently rapidly to completely replace the dye in a few seconds time. Since the total dye in the cell need be only about $10^{-3}$ cc., a liter of dye will last many days. The plates 551 and 552 may be provided with double quarter antireflection coatings on both front and back surfaces. When the dye is replaced after each laser pulse, the output power is limited by potential damage to the glass plate 551 and 552. Since the damage threshold for typical optical glass is about $10^{10}$ watts/cm.$^2$, at least 4 watts of output power can be extracted from each mode.

ALTERNATE EMBODIMENTS

Figure 21:
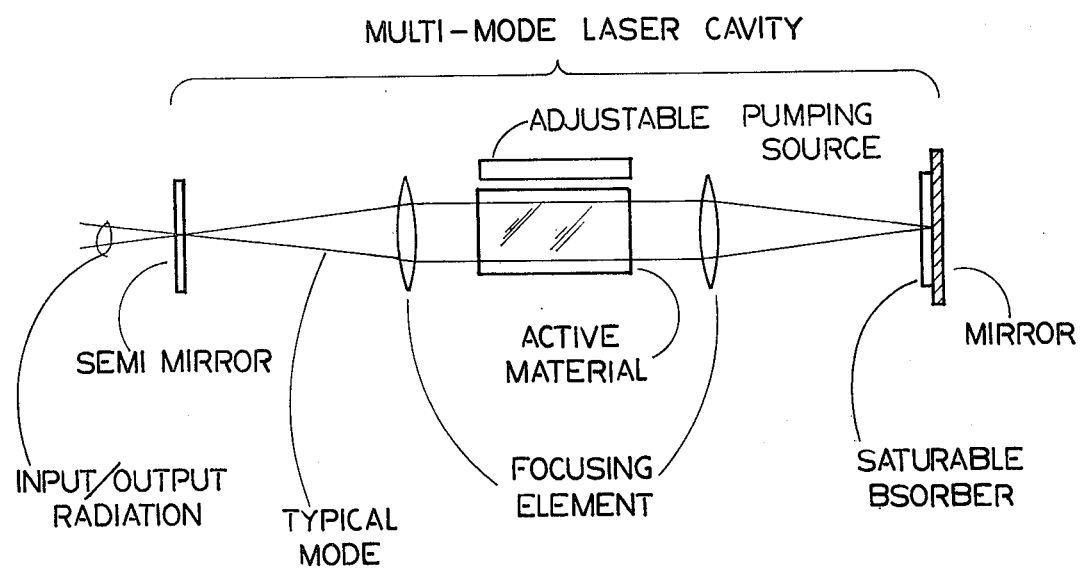
FIG. 21 is a schematic drawing showing the principal elements of the multi-mode threshold laser and their basic relationships to each other.

The basic framework of the multi-mode threshold laser concept is shown schematically in FIG. 21. A multi-mode laser with an adjustable pump source and independent, spatially separated degenerate modes becomes a multi-mode threshold laser when the saturable absorber is added in the region of spatial separation and input signal radiation entering the cavity approximately in a mode selectively bleaches the saturable absorber, thus controlling mode oscillation. Typically, the spatial separation of the modes is obtained by focusing elements in the cavity. Many embodiments of this invention readily suggest themselves.

A series of embodiments may be obtained by varying the specified parameter values given for the previously described embodiments. These variations may be suggested by empirical tests and empirical adjustments made for the purpose of optimizing performance for given material samples, component dimensions, component locations and functional specifications.

The focusing elements can be cylindrical lenses which give regions of spatial separation which are lines rather than points. This allows increased power for given saturable absorber damage. Conical optical elements can give regions of spatial separation of still different shape. The focusing elements can be reflective as well as transmissive.

Different forms of lasing materials may be used. For example, argon gas may be used in the specific embodiment gas laser. The same saturable absorber is appropriate to the argon ion wavelengths. The lasing material may be $Nd^{3+}$:YAG in a solid state embodiment. This operates at an infrared wavelength and a possible saturable absorber is then the polymethine dye 3, 3'-diethyl-9, 11; 15, 17 dineopentylene-thia-pentacarbocyanine iodide as described by B. Soffer and R. Hoskins in Nature, Vol. 204, p. 276, Oct. 17, 1964. Either pulsed or continuous operation can be used with this material.

The ruby embodiments can be operated with either the amplifying elements or the saturable absorber or both at cryogenic temperatures. Improved performance is then obtained but operation becomes much more difficult.

The techniques illustrated in the embodiments given in this disclosure may be combined in other ways to give other embodiments. For example, the saturable absorber in the second embodiment could also be an ultraviolet illuminated photochromic material. Also the methods of equalizing mode gain given for the second and third embodiments can be used in other embodiments. Methods of preventing damage to the mode gain equalizing films and saturable absorber films can be used in embodiments other than that for which they were presented. Or if the modes are sufficiently degenerate in any embodiment, the gain equalization films can be omitted. Coupling of modes symmetric with respect to the optic axis can be prevented by wedging flat faces or by using only the modes on one side of the optic axis in any embodiment. The entrance into the cavities of the fourth and preferred embodiments can be via flat semi-mirrors placed in that part of the cavities in which the modes are plane waves as shown in the third embodiment.

Another variation can be obtained by using a Faraday rotator to get a more reliable traveling wave direction in the fourth embodiment. Auxiliary intercavity components such as filters, polarizers, etc., as used in the fourth and preferred embodiments can be simplified or eliminated to obtain embodiments of reduced cost and efficiency.

In the embodiments shown in this disclosure, the optical density of the saturable absorber is high enough to prevent the fluorescent radiation emitted by the active material from bleaching the saturable absorber independently of the input radiation. Even if the saturable absorber is uniformly bleached by the fluorescence or ambient light in the course of the computing cycle, the invention will still be operable provided the input signal is received early in the cycle, before bleaching is complete, and selects the oscillating modes. Then a reduction in pumping rate, or other means, can prevent nonselected modes from oscillating since the oscillating modes tend to capture available energy. This method of operation can increase sensitivity, but reliability and output power are reduced. In still another variation, the input signal causes the saturable absorber to attain a negative absorption, or inversion, so that selected modes oscillate even though the laser has a gain less than unity.

The use of field lenses in the regions of spatial separation in the fourth and preferred embodiments will reduce mode walk-off and permit a wider mode field. In any embodiment with two regions of spatial separation, two separate saturable absorber films may be used each of half the density, thus permitting higher output power. Also, one set of modes could be provided with one type of saturable absorber located in one region of spatial separation while other modes could be provided with a different type of saturable absorber located in the other region of spatial separation. Or different saturable absorbers could be provided in different parts of the same region of spatial separation. Two or more different sets of modes could be provided with different gains by means of different attenuations in each so that each set would have a different threshold and different power output.

Various means can be used for adjusting the pumping rate other than those already mentioned such as interposition of a variable optical attenuator between flashlamp and lasing element for an optically pumped system. Adjustment of the gain in the cavity to get the proper threshold can be achieved by an electro-optic element in the resonant structure as well as by varying saturable absorber density as previously described.

Reflections in the fourth and preferred embodiments can be effected by metallic mirrors rather than total internal reflection. Similarly, beam splitting can be effected by semi-mirrors rather than frustrated total internal reflection. The diameter of the mode circles can be reduced by refined optical design at the expense of decreased total output power and increased cost. The width of the mode field and the number of independent degenerate modes can be increased by refined optical design but at increased cost and complexity. Dimensions of the embodiments shown can be changed with consequent changes in sensitivity, degeneracy and output power. Numerous other variations in optical and laser techniques can be invoked without departing from the scope of the disclosed invention.

What is claimed is:

1. A method for simultaneously controlling the oscillation of a large number of modes of a multi-mode laser with spatially separated modes such that for each such mode there exists a region of spatial separation, where the intensity of said mode is relatively high and the intensity of all other modes is very low, including the steps of:
   (a) placing a saturable absorber, bleachable by the radiation emitted by the multi-mode laser, in the region of spatial separation of each mode to be controlled;
   (b) directing optical control beams, capable of bleaching the saturable absorber, onto the saturable absorber contained in the region of spatial separation of each mode which is to be caused to oscillate, one distinct optical control beam for each such mode;
   (c) pumping the multi-mode laser to the extent that a mode not containing saturable absorber in its region of spatial separation is able to oscillate but modes containing saturable absorber in their regions of spatial separation are not able to oscillate;
wherein the improvement comprises the additional steps of:
   (d) selecting the frequency of the optical control beams to be within the gain profile of the active element of the multi-mode laser;
   (e) reshaping the wave front shape of the optical control beams to be the same as the wave front shape of the beams emitted by the modes that said optical control beams are to control, each optical control beam wave front shape being matched to the wave front shape of the beam emitted by the specific mode which it is to control; and
   (f) simultaneously redirecting the reshaped optical control beams toward the multi-mode laser so that their direction of propagation is the reverse of the beams emitted by the respective modes which they are to control, and so that the reshaped optical control beams simultaneously enter the modes which they are to control and are substantially amplified by the active element of the multi-mode laser before being absorbed by the saturable absorber thus increasing the sensitivity of the control operation to the optical control beams.

2. A method for simultaneously controlling the oscillation of a large number of modes of a multi-mode laser having an optically resonant cavity and having spatially separated modes of substantially the same wavelength, such that for each such mode there exists a region of spatial separation in the cavity, where the intensity of said mode is relatively high and the intensity of all other modes is very low, including the steps of:
   (a) placing a saturable absorber, bleachable by the radiation emitted by the multi-mode laser, in said region of spatial separation of each mode to be controlled;
   (b) directing optical control beams all of substantially equal frequency, capable of bleaching the saturable absorber, onto the saturable absorber contained in said region of spatial separation of each mode which is to be caused to oscillate, one distinct optical control beam for each such mode;
   (c) pumping the multi-mode laser to the extent that a mode not containing saturable absorber in said region of spatial separation is able to oscillate but modes containing saturable absorber in their regions of spatial separation in the cavity are not able to oscillate;
wherein the improvement comprises the additional steps of:
   (d) selecting the frequency of the optical control beams to be within the gain profile of the active element of the multi-mode laser;
   (e) reshaping the wave front shape of the optical control beams to be the same as the wave front shape of the beams emitted by the modes that said optical control beams are to control, each optical control beam wave front shape being matched to the wave front shape of the beam emitted by the specific mode which it is to control; and
   (f) simultaneously redirecting the reshaped optical control beams toward the multi-mode laser so that their direction of propagation is the reverse of the beams emitted by the respective modes which they are to control, and so that the reshaped optical control beams simultaneously enter the modes which they are to control and are substantially amplified by the active element of the multi-mode laser before being absorbed by the saturable absorber thus increasing the sensitivity of the control operation to the optical control beams.

3. A method for simultaneously comparing the values of the intensity of a large number of coherent optical beams, having substantially the same wavelength, to a threshold intensity value, so as to determine the identities of those beams of said optical beams which have intensity values above the threshold intensity value, including the steps of:
   (a) providing a multi-mode laser, having an optically resonant cavity and having independent, degenerate, spatially separated modes all of substantially equal frequency, each mode of said modes having a region of spatial separation in the cavity, where the intensity of said mode is relatively high and the intensity of all other modes of said modes is very low, and the multi-mode laser having at least one such mode for each beam of said optical beams;
   (b) placing a saturable absorber bleachable by said optical beams in said region of spatial separation of each mode of said modes of the multi-mode laser;
   (c) directing said optical beams onto the saturable absorber contained in said region of spatial separation of said modes of the multi-mode laser, each beam of said optical beams being directed to the saturable absorber contained in said region of spatial separation of exactly one mode of said modes; so that each beam of said optical beams illuminates a portion of the saturable absorber and tends to bleach the illuminated saturable absorber, and the higher the intensity of each beam of said optical beams, the greater the amount of the bleaching of the saturable absorber illuminated by said beam;
   (d) pumping the multi-mode laser to the extent that any mode of said modes of the multi-mode laser having said saturable absorber in its region of spatial separation illuminated by a beam of said optical beams having an intensity value below the threshold intensity value is not able to oscillate, but any mode of said modes having said saturable absorber in its region of spatial separation illuminated by a beam of said optical beams having an intensity value above the threshold intensity value is able to oscillate;
   (e) reading the results from the emission of coherent radiation emitted by the oscillating modes of said modes of the multi-mode laser, the oscillation of a mode of said modes indicating that the beam of said optical beams directed onto said saturable absorber in the region of spatial separation of said mode has an intensity value above the threshold intensity value;

wherein the improvement comprises the additional steps of:

(f) selecting the frequency of said modes of the multi-mode laser to be the same as the frequency of said optical beams;

(g) reshaping the wavefront shape of said optical beams to be the same as the wavefront shape of the beams emitted by said modes of the multi-mode laser, the wavefront shape of each beam of said optical beams being matched to the wavefront shape of the beam emitted by the mode of said modes having said saturable absorber in its region of spatial separation illuminated by said optical beam; and (h) simultaneously redirecting the reshaped optical beams toward the multi-mode laser; and giving each beam of the reshaped optical beams a direction of propagation the reverse of the beam emitted by the mode of said modes of the multi-mode laser having said saturable absorber in its region of spatial separation illuminated by said optical beam; so that the reshaped optical beams enter said modes and so that the reshaped optical beams are substantially amplified by the active element of the multi-mode laser before being absorbed by the saturable absorber thus increasing the sensitivity of the threshold action to the intensity of the optical beams; and so that the partially bleached saturable absorber is further bleached by the stimulated radiation in the modes thus increasing the sharpness of the threshold action and simplifying the adjustment of the pump rate to that precise level required to yield the proper threshold intensity value.

4. A method for simultaneously comparing the values of the energy of a large number of simultaneous optical pulses, transmitted by a large number of coherent optical beams having substantially the same wavelength, to a threshold energy value, so as to determine the identities of those beams of said optical beams which transmit pulses having energy values above the threshold energy value; each pulse of said pulses being transmitted by exactly one beam of said optical beams and each beam of said optical beams transmitting exactly one pulse of said pulses; including the steps of:

(a) providing a multi-mode laser, having an optically resonant cavity and having independent, degenerate, spatially separated modes all of substantially equal frequency, each mode of said modes having a region of spatial separation in the cavity, where the intensity of said mode is relatively high and the intensity of all other modes of said modes is very low, and the multi-mode laser having at least one such mode for each beam of said optical beams;

(b) placing a saturable absorber bleachable by said optical beams and having a recovery time longer than the duration of said pulses, in said region of spatial separation of each mode of said modes of the multi-mode laser;

(c) directing said optical beams onto the saturable absorber contained in said region of spatial separation of said modes of the multi-mode laser, each beam of said optical beams being directed to the saturable absorber contained in said region of spatial separation of exactly one mode of said modes; so that each beam of said optical beams illuminates a portion of the saturable absorber and tends to bleach the illuminated saturable absorber, and the higher the energy of each beam of said optical beams, the greater the amount of the bleaching of the saturable absorber illuminated by said beam;

(d) pumping the multi-mode laser during the occurrence of said pulses to the extent that any mode of said modes of the multi-mode laser having said saturable absorber in its region of spatial separation illuminated by a beam of said optical beams transmitting a pulse of said pulses having an energy value below the threshold energy value is not able to oscillate, but any mode of said modes having said saturable absorber in its region of spatial separation illuminated by a beam of said optical beams transmitting a pulse of said pulses having an energy value above the threshold energy value is able to oscillate;

(e) reading the results from the emission of coherent radiation emitted by the oscillating modes of said modes of the multi-mode laser, the oscillation of a mode of said modes indicating that the beam of said optical beams directed onto said saturable absorber in the region of spatial separation of said mode is transmitting a pulse of said pulses having an energy value above the threshold energy value;

wherein the improvement comprises the additional steps of:

(f) selecting the frequency of said modes of the multi-mode laser to be the same as the frequency of said optical beams;

(g) reshaping the wavefront shape of said optical beams to be the same as the wavefront shape of the beams emitted by said modes of the multi-mode laser, the wavefront shape of each beam of said optical beams being matched to the wavefront shape of the beam emitted by the mode of said modes havng said saturable absorber in its region of spatial separation illuminated by said optical beam; and (h) simultaneously redirecting the reshaped optical beams toward the multi-mode laser; and giving each beam of the reshaped optical beams a direction of propagation the reverse of the beam emitted by the mode of said modes of the multi-mode laser having said saturable absorber in its region of spatial separation illuminated by said optical beam; so that the reshaped optical beams enter said modes and so that the reshaped optical beams are substantially amplified by the active element of the multi-mode laser before being absorbed by the saturable absorber thus increasing the sensitivity of the threshold action to the energy of the optical beams; and so that the partially bleached saturable absorber is further bleached by the stimulated radiation in the modes thus increasing the sharpness of the threshold action and simplifying the adjustment of the pump rate to that precise level required to yield the proper threshold energy value.

5. A method for simultaneously comparing the values of the intensity of a large number of coherent optical beams of unequal intensity values, having substantially the same wavelength, the intensity value of each beam of said optical beams being compared to the intensity value of every other beam of said optical beams, so as to determine the identity of the beam of said optical beams having the greatest intensity value, including the steps of:
  (a) providing a multi-mode laser, having an optically resonant cavity and having independent, degenerate, spatially separated, traveling wave modes all of substantially equal frequency, each mode of said modes having a region of spatial separation in the cavity where the intensity of said mode is relatively high and the intensity of all other modes of said modes is very low, and the multi-mode laser having at least one such mode for each beam of said optical beams;
  (b) placing a saturable absorber bleachable by said optical beams in said region of spatial separation of each mode of said modes of the multi-mode laser;
  (c) directing said optical beams onto the saturable absorber contained in said region of spatial separation of said modes of the multi-mode laser, each beam of said optical beams being directed to the saturable absorber contained in said region of spatial separation of exactly one mode of said modes; so that each beam of said optical beams illuminates a portion of the saturable absorber and tends to bleach the illuminated saturable absorber, and the higher the intensity of each beam of said optical beams, the greater the amount of the bleaching of the saturable absorber illuminated by said beam;
  (d) increasing the pumping rate of the multi-mode laser from a level near zero at which no mode of said modes of the multi-mode laser is able to oscillate, to a level sufficient to allow exactly one mode of said modes to oscillate;
  (e) reading the results from the emission of coherent radiation emitted by the oscillating mode of said modes of the multi-mode laser, the oscillation of that mode of said modes indicating that the beam of said optical beams directed onto said saturable absorber in the region of spatial separation of said mode has the greatest intensity value;
wherein the improvement comprises the additional steps of:
  (f) selecting the frequency of said modes of the multi-mode laser to be the same as the frequency of said optical beams;
  (g) reshaping the wavefront shape of said optical beams to be the same as the wavefront shape of the beams emitted by said modes of the multi-mode laser, the wavefront shape of each beam of said optical beams being matched to the wavefront shape of the beam emitted by the mode of said modes having said saturable absorber in its region of spatial separation illuminated by said optical beam; and
  (h) simultaneously redirecting the reshaped optical beams toward the multi-mode laser; and giving each beam of the reshaped optical beams a direction of propagation the reverse of the beam emitted by the mode of said modes of the multi-mode laser having said saturable absorber in its region of spatial separation illuminated by said optical beam; so that the reshaped optical beams enter said modes and so that the reshaped optical beams are substantially amplified by the active element of the multi-mode laser before being absorbed by the saturable absorber thus increasing the sensitivity of the comparison to the intensity of the optical beams; and so that the partially bleached saturable absorber is further bleached by the stimulated radiation in the modes thus increasing the sharpness of the comparison and simplifying the adjustment of the pump rate to that level required to cause exactly one mode of said modes to oscillate.

6. A method of simultaneously comparing the values of the energy of a large number of simultaneously optical pulses of unequal energy values transmitted by a large number of coherent optical beams having substantially the same wavelength, the energy value of each pulse of said pulses being compared to the energy value of every other pulse of said pulses, so as to determine the identity of the beam of said optical beams transmitting the pulse of said pulses with the greatest energy value, each pulse of said pulses being transmitted by exactly one beam of said optical beams and each beam of said optical beams transmitting exactly one pulse of said pulses, including the steps of:
  (a) providing a multi-mode laser, having:
    an optically resonant cavity, formed from two corner cube reflectors facing each other and located on a common diagonal, and containing a pair of lenses positioned in the cavity so as to have a common focal plane in the cavity and to have their optic axes parallel to the common diagonal of the corner cube reflectors;
    independent, degenerate, spatially separated, traveling wave modes all of substantially equal frequency, and each such mode having a region of spatial separation in the common focal plane of the lenses where the intensity of said mode is relatively high and the intensity of all other modes of said modes is very low; and
    at least one such independent, degenerate, spatially separated, traveling wave mode for each beam of said optical beams;
  (b) placing a saturable absorber bleachable by said optical beams and having a recovery time longer than the duration of said pulses in said region of spatial separation of each mode of said modes of the multi-mode laser;
  (c) directing said optical beams onto the saturable absorber contained in said region of spatial separation of said modes of the multi-mode laser, each beam of said optical beams being directed to the saturable absorber contained in said region of spatial separation of exactly one mode of said modes; so that each beam of said optical beams illuminates a portion of the saturable absorber and tends to bleach the illuminated saturable absorber, and the higher the energy of each beam of said optical beams, the greater the amount of the bleaching of the saturable absorber illuminated by said beam;
  (d) increasing the pumping rate of the multi-mode laser, during the occurrence of said pulses, from a level near zero at which no mode of said modes is able to oscillate, to a level sufficient to allow exactly one mode of said modes to oscillate;
  (e) reading the results from the emission of coherent radiation emitted by the oscillating mode of said modes of the multi-mode laser, the oscillation of that mode of said modes indicating that the beam of said optical beams directed onto the saturable absorber in the region of spatial separation of said mode is transmitting the pulse of said pulses having the greatest energy value;
wherein the improvement comprises the additional steps of:

(f) selecting the frequency of said modes of the multi-mode laser to be the same as the frequency of said optical beams;
(g) reshaping the wavefront shape of said optical beams to be the same as the wavefront shape of the beams emitted by said modes of the multi-mode laser, the wavefront shape of each beam of said optical beams being matched to the wavefront shape of the beam emitted by the mode of said modes having said saturable absorber in its region of spatial separation illuminated by said beam; and
(h) simultaneously redirecting the reshaped optical beams toward the multi-mode laser; and giving each beam of said beams a direction of propagation the reverse of the beam emitted by the mode of said modes of the multi-mode laser having said saturable absorber in its region of spatial separation illuminated by said beam; so that the reshaped optical beams enter said modes and so that said beams are substantially amplified by the active element of the multi-mode laser before being absorbed by the saturable absorber thus increasing the sensitivity of the comparison to the energy of the optical beams; and so that the partially bleached saturable absorber is further bleached by the stimulated radiation in the modes thus increasing the sharpness of the comparison and simplifying the adjustment of the pump rate to that level required to cause exactly one mode of said modes to oscillate.

* * * * *